United States Patent
Singh Atwal et al.

(10) Patent No.: US 12,389,224 B2
(45) Date of Patent: Aug. 12, 2025

(54) SYSTEM, DEVICE AND METHOD FOR ACCESSING SHARED INFRASTRUCTURE

(71) Applicant: SITA Information Networking Computing USA, Inc., Atlanta, GA (US)

(72) Inventors: Balwinder Singh Atwal, Bohemia, NY (US); Matthys Christiaan Serfontein, Atlanta, GA (US); Shamus Edward Gleason, Bohemia, NY (US); Mian Tamur Ul Haq, Bohemia, NY (US); Eric Richard Torbenson, Bohemia, NY (US)

(73) Assignee: SITA Information Networking Computing USA, Inc., Atlanta, GA (US)

( * ) Notice: Subject to any disclaimer, the term of this patent is extended or adjusted under 35 U.S.C. 154(b) by 461 days.

(21) Appl. No.: 16/491,988

(22) PCT Filed: Mar. 7, 2018

(86) PCT No.: PCT/IB2018/051490
§ 371 (c)(1),
(2) Date: Sep. 6, 2019

(87) PCT Pub. No.: WO2018/163087
PCT Pub. Date: Sep. 13, 2018

(65) Prior Publication Data
US 2020/0045547 A1    Feb. 6, 2020

Related U.S. Application Data

(60) Provisional application No. 62/468,067, filed on Mar. 7, 2017.

(51) Int. Cl.
*G06Q 10/02* (2012.01)
*G06F 3/12* (2006.01)
(Continued)

(52) U.S. Cl.
CPC ........ *H04W 12/068* (2021.01); *G06F 3/1222* (2013.01); *G06F 3/1238* (2013.01);
(Continued)

(58) Field of Classification Search
None
See application file for complete search history.

(56) References Cited

U.S. PATENT DOCUMENTS 6,259,405 B1    7/2001   Stewart et al.
7,743,074 B1*   6/2010   Parupudi .............. H04W 4/18
                                                455/456.2
(Continued)

FOREIGN PATENT DOCUMENTS

KR   101728892 B1    5/2017
RU   2014125180 A   12/2015
(Continued)

OTHER PUBLICATIONS

Avoiding The Blues for Airline Travelers, Snowdon et al., Proceedings of the 1998 Winter Simulation Conference.*
(Continued)

*Primary Examiner* — David J Stoltenberg
(74) *Attorney, Agent, or Firm* — Bradley Arant Boult Cummings LLP; Daniel E. Sineway, Esq.; Adam J. Thompson, Esq.

(57) ABSTRACT

A computer processing device for providing access to one or more electronic devices is provided. The device comprising processing means (103) configured to: determine a location identifier associated with a user login event; associate the location identifier with a user session identifier; and communicate (3013) the location identifier and associated user session identifier to an application (109).

26 Claims, 4 Drawing Sheets

(51) Int. Cl.
  *H04W 4/021* (2018.01)
  *H04W 4/029* (2018.01)
  *H04W 4/33* (2018.01)
  *H04W 12/06* (2021.01)
  *H04W 4/80* (2018.01)
  *H04W 12/63* (2021.01)

(52) U.S. Cl.
  CPC ........... *G06F 3/1243* (2013.01); *G06Q 10/02* (2013.01); *H04W 4/021* (2013.01); *H04W 4/029* (2018.02); *H04W 4/33* (2018.02); *G06F 3/1292* (2013.01); *H04W 4/80* (2018.02); *H04W 12/63* (2021.01)

(56) References Cited

U.S. PATENT DOCUMENTS

| | | | |
|---|---|---|---|
| 7,802,724 B1 * | 9/2010 | Nohr | G07C 9/28 235/384 |
| 9,986,040 B2 | 5/2018 | Dersy | |
| 9,986,041 B2 | 5/2018 | Dersy | |
| 10,009,868 B1 * | 6/2018 | Reyes | H04W 72/048 |
| 10,455,027 B2 | 10/2019 | Dersy | |
| 2001/0018349 A1 | 8/2001 | Kinnunen | |
| 2005/0065834 A1 * | 3/2005 | Hale | G06Q 10/04 700/83 |
| 2006/0059024 A1 * | 3/2006 | Bailey | G06Q 10/02 705/5 |
| 2008/0129488 A1 * | 6/2008 | Hill | G06Q 10/08 340/539.13 |
| 2008/0133127 A1 * | 6/2008 | Havens | G07C 9/28 701/519 |
| 2008/0167887 A1 * | 7/2008 | Marcken | G06Q 10/02 705/5 |
| 2008/0252910 A1 | 10/2008 | Cordesses et al. | |
| 2009/0119135 A1 * | 5/2009 | Schoeman | G06Q 50/40 705/5 |
| 2010/0078475 A1 * | 4/2010 | Lin | B64F 1/366 235/380 |
| 2010/0273509 A1 * | 10/2010 | Sweeney | H04W 4/029 705/5 |
| 2011/0133892 A1 * | 6/2011 | Nohr | G07C 9/28 340/10.1 |
| 2011/0231212 A1 * | 9/2011 | Hurley | B64F 1/366 705/5 |
| 2012/0086549 A1 * | 4/2012 | Barnes, Jr. | G06Q 20/04 340/5.61 |
| 2012/0200390 A1 * | 8/2012 | Saravanan | G07C 9/27 340/5.61 |
| 2013/0167208 A1 | 6/2013 | Shi | |
| 2014/0006071 A1 * | 1/2014 | Sear | G06Q 50/14 705/5 |
| 2014/0018112 A1 * | 1/2014 | Cohen-Zur | H04W 4/04 455/457 |
| 2014/0050122 A1 * | 2/2014 | Pro | H04W 4/029 705/14.63 |
| 2014/0351832 A1 * | 11/2014 | Cho | H04L 67/141 719/328 |
| 2015/0095073 A1 * | 4/2015 | Li | G06Q 30/0269 705/6 |
| 2015/0178641 A1 * | 6/2015 | Yepez | H04W 12/06 705/5 |
| 2015/0289087 A1 * | 10/2015 | Oki | H04W 12/06 455/411 |
| 2016/0311348 A1 | 10/2016 | Watson et al. | |
| 2017/0068551 A1 * | 3/2017 | Vadodaria | G06Q 10/107 |
| 2017/0169528 A1 * | 6/2017 | Kundu | G06Q 50/14 |
| 2017/0187817 A1 * | 6/2017 | Kajak | G06Q 50/14 |
| 2017/0208131 A1 * | 7/2017 | Dersy | H04L 12/4641 |
| 2018/0025293 A1 * | 1/2018 | Flotat | G06Q 20/356 705/5 |
| 2018/0032926 A1 * | 2/2018 | DeLuca | G06Q 10/025 |
| 2018/0121834 A1 * | 5/2018 | Wong | G06Q 10/02 |
| 2019/0138949 A1 * | 5/2019 | Malinofsky | H04W 4/029 |
| 2020/0151626 A1 * | 5/2020 | Mateer | G06K 7/1413 |

FOREIGN PATENT DOCUMENTS

| | | | | |
|---|---|---|---|---|
| RU | 2602668 C2 | | 11/2016 | |
| WO | WO 2001/063533 | * | 2/2001 | ............. G06Q 10/02 |
| WO | WO 2001/037169 A1 | * | 5/2001 | ............... G07C 9/00 |
| WO | WO 200101/92910 | * | 12/2001 | ................ G01S 5/00 |
| WO | WO 2006029639 | * | 3/2006 | ............. G07B 15/00 |
| WO | 2014095030 A1 | | 6/2014 | |
| WO | 2016178731 A1 | | 11/2016 | |

OTHER PUBLICATIONS

Architecture of a Passenger Information System for Public Transport Services, Hiinnikainen et al., 0-7803-7005-8/01/%100.0 200 01 IEEE.*

An Integration Framework for Airport Automation Systems, Ningjiang "Jay" Cheng; 2001 The MITRE Corporation. All Rights Reserved.*

End-to-end passenger travel assistance from airport to airport with wearable device; IPCOM000239235D IP.com Electronic Publication Date: Oct. 23, 2014.*

Jones, Industry Track: Next Generation Airline Information Using Consumer Devices to keep passengers informed and as an additional channel to market, Proceedings of the 2004 IEEE International Conference on Mobile Data Management 0-7695-2070-7/04 2004.*

International Search Report and Written Opinion issued in Application No. PCT/IB2018/051490, mailed May 11, 2018.

Examination Report issued in Application No. 2018231765, dated Oct. 9, 2023.

* cited by examiner

SYSTEM, DEVICE AND METHOD FOR ACCESSING SHARED INFRASTRUCTURE

CROSS REFERENCE TO RELATED APPLICATIONS

This application claims benefit and priority to co-pending U.S. Patent Application No. PCT/IB2018/051490, filed Mar. 7, 2018, entitled "SYSTEM, DEVICE AND METHOD FOR ACCESSING SHARED INFRASTRUCTURE", which claims priority to U.S. Provisional Patent Application No. 62/468,067, filed Mar. 7, 2017, entitled "SYSTEM, DEVICE AND METHOD FOR ACCESSING SHARED INFRASTRUCTURE," each of which are incorporated herein by reference in their entirety.

FIELD OF THE INVENTION

This invention relates in general to a system, method and a device for providing access to shared infrastructure, such as a computer-implemented device. The shared infrastructure may be may be a device such as a printer for printing a boarding pass or bag tag, a scanner for reading documents, or a kiosk for printing a boarding pass or a bag tag. The system may for example be for use by customers, passengers, and agents providing services to the customers or passengers.

BACKGROUND OF THE INVENTION

Usually, airlines share a common infrastructure, such as computing devices which are generally provided by an airport, to process their passengers. Known shared common infrastructure solutions are inflexible, costly, difficult to deploy and operate, and do not easily accommodate the latest technology such as the use of mobile devices. This is because known solutions force airlines to work with the lowest common denominator environment. For example, a specific version of Microsoft Windows™, a specific version of Adobe™ Flash™, or a specific version of JAVA™ which are commonly used by shared devices in the airport environment may determine how know solutions interact with, or access specific services. This may lead to technical difficulties in providing access to the shared devices.

It will also be appreciated that known platforms, such as the Microsoft™ Windows™ platform which may operate on shared devices, are closed platforms. This forces users to access devices in the local airport environment by way of a local interface to communicate with the platform. Thus, there is no provision to be able to commute remotely with one or more devices in the local airport environment.

Accordingly, it will be appreciated that known solutions link the features of end peripherals (such as a printers, scanners, and so on) through the application interface thus preventing peripherals to evolve and add passenger usability features without impacting the application.

Further, Virtual Private Network, VPN, systems have the problem that they require users to input additional data such as further log-on credentials after accessing remote systems via the VPN, which can simply be thought of a tunnel through which communications are sent.

SUMMARY OF THE INVENTION

The invention aims to address these problems by providing a computer processing device for providing access to one or more electronic devices. The device comprises processing means configured to: determine a location identifier associated with a user login event; associate the location identifier with a user session identifier; and communicate the location identifier and associated user session identifier to an application.

Further, embodiments of the invention provide a mechanism which provides one or more tokens to one or more devices. Use of particular tokens by devices facilitate communication without intervention.

This is in contrast to VPN systems which do not have a number of different functional components which transform the data content as the data is passed between the functional components.

Thus, the system allows airlines to operate in their own environment without any restriction imposed by another airline sharing the common infrastructure. The invention provides cloud based services that lowers cost and provides efficient deployment and operational model. The invention allows segregation of an airport environment from the airline environment, thus allowing all entities to evolve based on their business needs. The invention provide a timeless interface for airlines applications based on essential data exchange using latest web technology. The interface removes the influence of client devices. The invention may comprise an easy-to-use portal that allows device providers at an airport to setup an environment which is independent of an airline's users. The portal allows airlines to activate their application instantly at available airports and locations with no dependency on a third party.

The core functionality of the solution provides common API's that allows an airline's applications to dynamically subscribe to shared or dedicated infrastructure at any location in any available airport at global scale. The shared or dedicated infrastructure is not limited to airports, and it may include parking lots, hotels, railway stations, convention centres, city centres, cruise ships etc. The API's may use location identification to associate airline user sessions to shared infrastructure. Location Identification is based on an easy-to-build naming convention that uniquely identifies any infrastructure at airports and non-airport locations. Client applications may obtain the location identification in a number of different ways, such as QR labels, Beacons, NFC and so on.

The architecture of the solution relies on separating the user interface from the physical devices that requires user interaction, for example the obtaining of boarding passes, dropping bags, scanning documents, payment and boarding gates etc. This may be achieved by way of 2 communication channels and this may provide the flexibility for user interface devices such as workstations, tablets, smart phones to evolve independent of devices such as a passport scanner, chip and pin for payment, self-bag drop and so on.

Embodiments of the invention also provide a solution to the need for backward compatibility. The platform provides a means for airlines to continue using their existing software with little or no modification, while taking advantage of the flexibility the new platform offers them. This may be achieved by way of a field gateway functionality.

Embodiments of the invention may employ an architecture which is able to provide access to shared infrastructure in a distributed framework. This implementation is not limited to a specific version of Microsoft™S Windows™, or Linux™ or Cisco™ IOx™, or Android™ applications.

Embodiments of the invention employ an architecture which is able to run on any of these systems. This may be achieved with the use of an internet browser. Usually, the browser is provided with html 5 standard. This may allow access to a Next Generation Portal, NGP distributed network or frame work of devices according to the html 5 standard. This has the advantage that the only local resources are those needed to run the browser. Accordingly, many of the processes requiring considerable processing power may be pushed into or performed in a host environment such as an airline back-end system, open server system, departure control system, in a data centre or in the cloud. This means that the only local resources which need to be used are those used by the browser. This allows certain applications to run faster than known solutions because for example a database does not need to be locally downloaded.

According to a first aspect of the present invention a data processing system for providing user access to one or more devices (108) is provided. The system comprises processing means (103) configured to: determine a location identifier for a user; associate the location identifier with a user identifier for the user; and communicate (3013) the location identifier and associated user identifier to an application (301).

According to a further aspect of the present invention a computer processing device for providing access to one or more electronic devices is provided. The device comprises processing means (103) configured to: i. determine a location identifier associated with a user login event; ii. associate the location identifier with a user session identifier; and iii. communicate (3013) the location identifier and associated user session identifier to an application (109).

According to a further aspect of the present invention an electronic device comprising a field gateway component for facilitating authentication with a remote environment is provided.

According to a further aspect of the present invention a method for providing access to one or more electronic devices is provided. The method comprises the steps of: a. determining a location identifier associated with a user login event; b. associating the location identifier with a user session identifier; and c. communicating (3013) the location identifier and associated user session identifier to an application (109).

According to a further aspect of the present invention a computer program product is provided for providing access to one or more electronic devices. The product, when executed performs the steps of determining a location identifier associated with a user login event; associating the location identifier with a user session identifier; and communicating (3013) the location identifier and associated user session identifier to an application (109).

An application may be provided in a remote data centre, and this allows for additional resources to be provided in the data centre. This allows performance to be increased as desired. In other words, embodiments of the invention allow for easy vertical scaling capability for example by adding additional memory or servers to the remote data centre as necessary.

A further benefit of using an html 5 enabled browser is that additional certification of any application is not needed. This provides a huge benefit to airlines since new functionality does not need to be certified as it is not deployed using a new application in the airport environment, but is rather provided via the html 5 enabled browser. Further, because there is no need for an application to share an environment with other vendor applications, liability for other vendor applications is avoided.

Further, it is easier for systems running embodiments of the invention to achieve PCI compliance since the environment is not shared between a number of different applications.

Embodiments of the invention may separate the data required to print or read a document from the features related to usability of the peripheral. The data exchange is part of the application interface where the usability part of the peripheral is controlled through configuration this allowing the peripherals to add usability features without impacting the applications and this preserves the longevity of the interface.

Embodiments of the invention employ a solution, referred to as a Next Generation Portal, NGP, solution. The solution may be implemented by providing 2 distinct channels. These channels may be referred to as a device channel, and a graphical user interface, GUI channel. This, coupled with an internet browser enabled with html 5, may provide many of the benefits outlined above.

Thus, the solution is based on a pure data exchange between different functional components. Other capability may be governed by configuration settings. Thus, if changes need to be made, then these changes may be performed by way of configuration capability settings. Accordingly, in some embodiments, an application interface is driven by pure data alone. Usability of the application is configured through configuration settings.

On the device side, a similar architecture may be employed. For example, this focuses on the logical separation of data exchange services and configuration services, which may relate to the look and feel of the device interface.

For example, the airport environment may make services available or in other words publish services to the API environment used by users. Subscribers to the application environment, such as an airline, may view the published services. This allows users to subscribe to any one or more of a number published services. The publication and subscription services may be provided independently.

In contrast to known VPN systems, in the present invention, data content is transformed by a number of functional components, also using bi-directional communication and end-to-end authentication. The data may be transformed based on a rules engine. Of course, the nature of the data transformation may be different for each user of the system, based on their needs.

Thus, embodiments of the invention may be based on a cloud platform such as Microsoft™ AZURE™ technology, specifically the use of IoT Hub, Service Fabric, API gateway, Stream Analytics and Machine learning. The solution is built using multifaceted security, specifically the use of stream analytics, machine learning and deep learning to profile the user and system behaviour to identify and adapt to anomalies.

According to an aspect of the present invention a data processing system or device for providing user access to one or more further devices (108) is provided. The device comprises processing means (103) configured to: determine a location identifier associated with a user login event; associate the location identifier with a user session identifier wherein the user session identifier is preferably associated with the user login event; and communicate (3013) the location identifier and associated user session identifier to an application (301).

According to a further aspect of the present invention a method for providing access to one or more electronic devices is provided. The method comprises the steps of a. determining a location identifier associated with a user login event; b. associating the location identifier with a user session identifier; and c. communicating (3013) the location identifier and associated user session identifier to an application (109).

BRIEF DESCRIPTION OF THE DRAWINGS

An embodiment of the invention will now be described, by way of example only, and with reference to the accompanying drawings, in which.

The following description is of a system for use in the aviation industry, but this is exemplary and other applications of the invention will also be discussed. For example, the system may be used in any environment where infrastructure is shared. The system may be embodied in a hosted system which may use API communications protocols to communicate with external systems such as reservation systems or departure control systems.

In this particular embodiment, Application Programming Interface, API, services or modules are built on a Microsoft AZURE platform. However, other platforms known to the skilled person may be used, such as an Amazon Web Services, AWS, cloud platform, an IBM cloud platform, or a Google cloud platform.

Further, it will be appreciated that the functionality may be implemented in any programming language, for example, html 5, C++™, JAVA™, and .xml may be used as well as other programming languages which will be known to the skilled person. For example, embodiments of the invention may use one of these programming languages to provide a web-based service.

Figure 1:
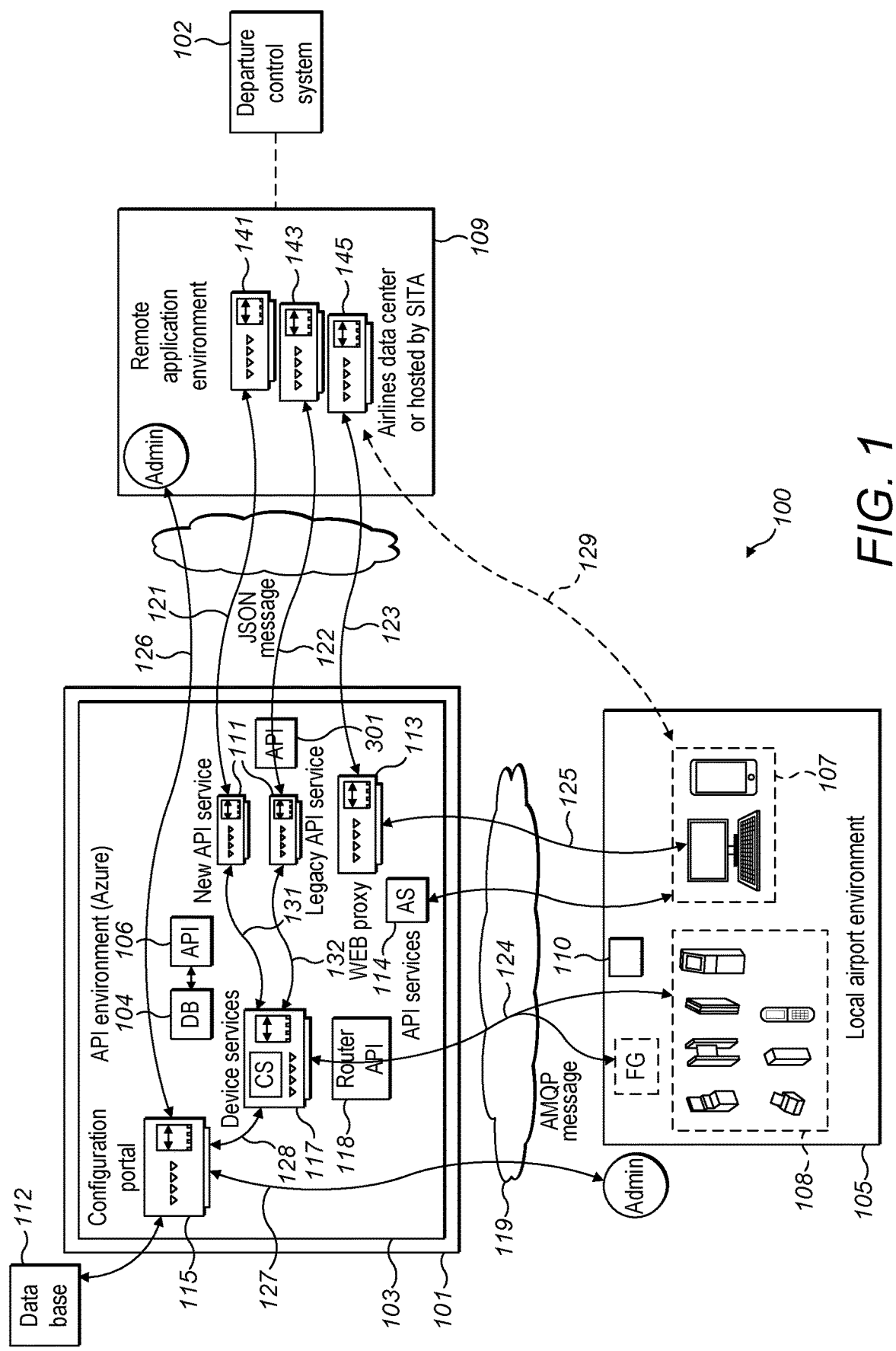
FIG. 1 is a schematic diagram of the main functional components embodying the invention.

Referring now to FIG. 1, this may be thought of as a schematic diagram showing the architecture of a system embodying the invention. This system may be provided as a part of a Next Generation Protocol, NGP, system.

In this specific embodiment, the system comprises three distinct zones: an API environment 103, an application environment 109, and an airport environment 105.

Usually, one or more of these zones are in different physical locations. For example, the API environment 103 may be physically located in a particular state, such as California in the United States, while the local airport environment 105 may be located for example in Bohemia in the United States. The specific airline application environment 109, hosting the one more applications 141, 143, 145 may also be in the United States. The application environment may be communicatively coupled to a departure control system, which may be hosted, for example, in a different region, location or country such as Germany.

In another specific example, the API environment 103 may be physically located in the Netherlands, while the one or more user devices 107 and associated GUI's running on the devices may be located in Frankfurt, Germany, while the one or more shared devices 108 may be located in Bohemia, United States. The application environment and associated applications 141, 143, 145 may also be located in the United States, while the departure control system or other back end system 102 is located in Germany.

Description of User Devices 107, Shared Devices 108, and Local and Remote Environments Usually, the airport environment comprises one or more computing devices, 107, 108. These computing devices may be divided in to 2 groups. The first group of computing devices 107, may comprise any one or more of shared workstation or tablet which an airline agent may bring to the airport to perform one or more functions such as check-in or boarding functions. The first group of computing devices may also include smart telephones or tablets or any other portable computing devices which passengers may bring to the airport environment in order to perform the function of printing boarding passes or bag tags or making payments such as payments for overweight baggage and so on. These computing devices will be referred to as user devices 107. In essence, these computing devices 107 provide a way to access shared infrastructure such as a second group of computing devices 108.

The second group of computing devices 108, may comprise any one or more of a printer or scanner or reader, check-in counter device, boarding counter device, kiosk (such as a kiosk for printing a boarding pass or bag tag), bag-drop counter device, security screening device or self-boarding gate device. In other words, the second group of computing devices 108 relate to shared infrastructure computing devices. The scanner or reader is usually configured to read a boarding pass or a bag tag, passport or identity card or other machine readable document. This is usually performed using an optical scan of the boarding pass or bag tag using Optical Character Recognition, OCR algorithms which will be known to the skilled person.

FIG. 1 shows an airport environment as an example but of course, it will be appreciated that this zone 105 may be any environment where shared infrastructure may be provided such as a railway station, a hotel, a convention centre, a cruise ship and so on. This zone 105 will be referred to as a local environment 105.

The application environment 109 is usually referred to as a remote zone 109. The application environment may comprise a data center or one or more computer servers used by, for example an airline. Further, the application environment functionality may be provided in a hosted environment.

Description of Main Functional Components

The system 100 may comprise any one or more of the following functional components: one or more modules or interfaces 111 for providing one or more services. The modules are usually respectively communicatively coupled to one or more applications 141, 143, 145. Further, each of the modules or interfaces may be communicatively coupled to one or more devices 108. Any of the functional components within the API environment 103 may be referred to as a module for performing one or more different functional operations.

For example, a server or computer 101 may be configured to run an Application Programming Interface, API, in an API environment 103. The computer server is usually communicatively coupled, via wired or wireless transmission means which will be known to the skilled person, to any one or more different functional components, shown in FIGS. 1, 2 and 3 of the drawings.

The application environment 109 and airport environment 105 may be provided by third parties and each of these environments 105 and 109 is usually communicatively coupled to one or more API services through a published interface. As previously mentioned, the application environment 109 usually resides on one or more computers or computer servers.

Usually, the local environment 105 is communicatively coupled to the API environment 103 via a wired or wireless communications protocols which will be known to the skilled person. Similarly, the remote environment 109 is usually communicatively coupled to the API environment 103 via a wired or wireless communications protocols which will be known to the skilled person.

Description of Database 104 and Beacon 110

As shown in FIG. 1 of the drawings, a database 104 may be provided as part of the system. Usually the data associated with the database is stored in a storage means or memory such as read only memory or random access memory. However, it is not essential that the database is located within the API environment. For example, the database may be provided at any location provided it is communicatively coupled to the API Azure environment. The database is usually searched by means of an API 106. The database usually comprises one or more different beacon identifiers such as a UUID and one or more different location identifiers, IDs. An association between each beacon identifier and each location identifier is provided, and the database, its structure and interaction with the other functional components shown in FIG. 1 will be described in further detail below.

The system usually further comprises one or more beacons 110. Each beacon is usually placed in close proximity to any one or more of the user devices 107 which may be used in the airport environment. For clarity, in FIG. 1, a single beacon 110 is shown. However, usually a plurality of beacons are provided at different locations. Each beacon is usually associated with a single piece of shared infrastructure 108.

Multiple shared devices 108 may be provided at a specific location. Each shared device usually has a unique identifier, for example a device identifier. The device identifier is usually in the form of an alphanumeric string. One specific example of a device identifier is deviceId: '413dc6c0a03d4d6a9cd2c1=='.

Further, in order to distinguish between the different functionality of multiple shared devices 108 at a particular location, each shared device 108 may have an associated device type or generic device label definition.

For example, a device type of LSR may indicate a barcode scanner used to scan a boarding pass or bag tag. A device type or label of MSR may indicate that the device is a Magnetic Swipe Reader used to read a credit card, or loyalty card. Other device types or labels may be BTP indicating that the device is a Bag Tag Printer or Boarding Pass Printer, referred to as ATP (Automated Ticketing and Boarding Printer) which indicating that the device is a Boarding Pass Printer. The combination of device type and location identifier allows a particular device to be uniquely identified in a particular region of the airport.

Description of User Session Identification Data and Authentication Services 114

An authentication services module 114 may be provided in the API environment 103. This allows users to subscribe to the system, and also provides subsequent access to the system with a user login and password.

Once a user has logged in, a login event is created. This generates a Location Identifier, ID, and user session identifier, ID. The location identifier may be determined by search a database (112) of previously stored location identifiers associated with different users. The location identifier may be selected based on a match between the user login and a matching user login and associated location identifier stored in the database (112). Additional information such as the location (e.g. longitude or latitude coordinates, country, state, or region) from which the user is logging on may also be used to uniquely determine from the database (112) a location identifier for the user.

Description of Published Interfaces

One or more of the interfaces or functional components shown in FIG. 1 of the drawings may be interfaces which are published or made available to $3^{rd}$ parties outside the API environment 103. For example, the configuration portal 115, Web Proxy service 113, and API services 111 and specific device service interfaces 117 may be thought of as published interfaces. The published interfaces have 2 distinct responsibilities.

Firstly, the API's or services 111 provide data exchange between the one or more applications 141, 143, 145 running in the remote environment 109 and one or more devices 107, 108 running at the local airport environment.

Secondly, the details related to specific device capabilities and end-user experience is provided via the configuration portal 115 shown in FIG. 1. The configuration portal 115 may seamlessly integrate API data with the device interface which couples the device services interface 117 to the one or more shared devices 108 in the airport environment. This allows the system to make use of the full capabilities of the devices 108. The configuration portal 115 and associated configuration settings associated with each shared device 108 are described in further detail below.

Functional Description of API's 111: Acknowledgement and Routing Function

The one or more API's 111 provided in the API environment may have two main functions. Firstly, they transmit acknowledgement messages in response to receiving message(s) 121, 122 from the one or more applications 141, 143, 145 in the remote application environment 109. Secondly, the have the function of routing messages to the correct device service within the device services API interface 117. Usually, this is needed because a number of different device services are provided within the device services interface, 117. For example, the services within the device services interface 117 may relate to printing a boarding pass or printing a bag tag or scanning a boarding pass or bag tag or to reading a credit card or loyalty card using a magnetic swipe reader and the like.

Thus, the API service(s) 111 may perform the function of both routing messages to the correct service within the device services interface 117, and also sending an acknowledgement message to acknowledge that a request from one of the applications 141, 143, 145 in the remote application environment has been correctly received by the API service 111.

CUTE Wrapper API 301

Figure 3:
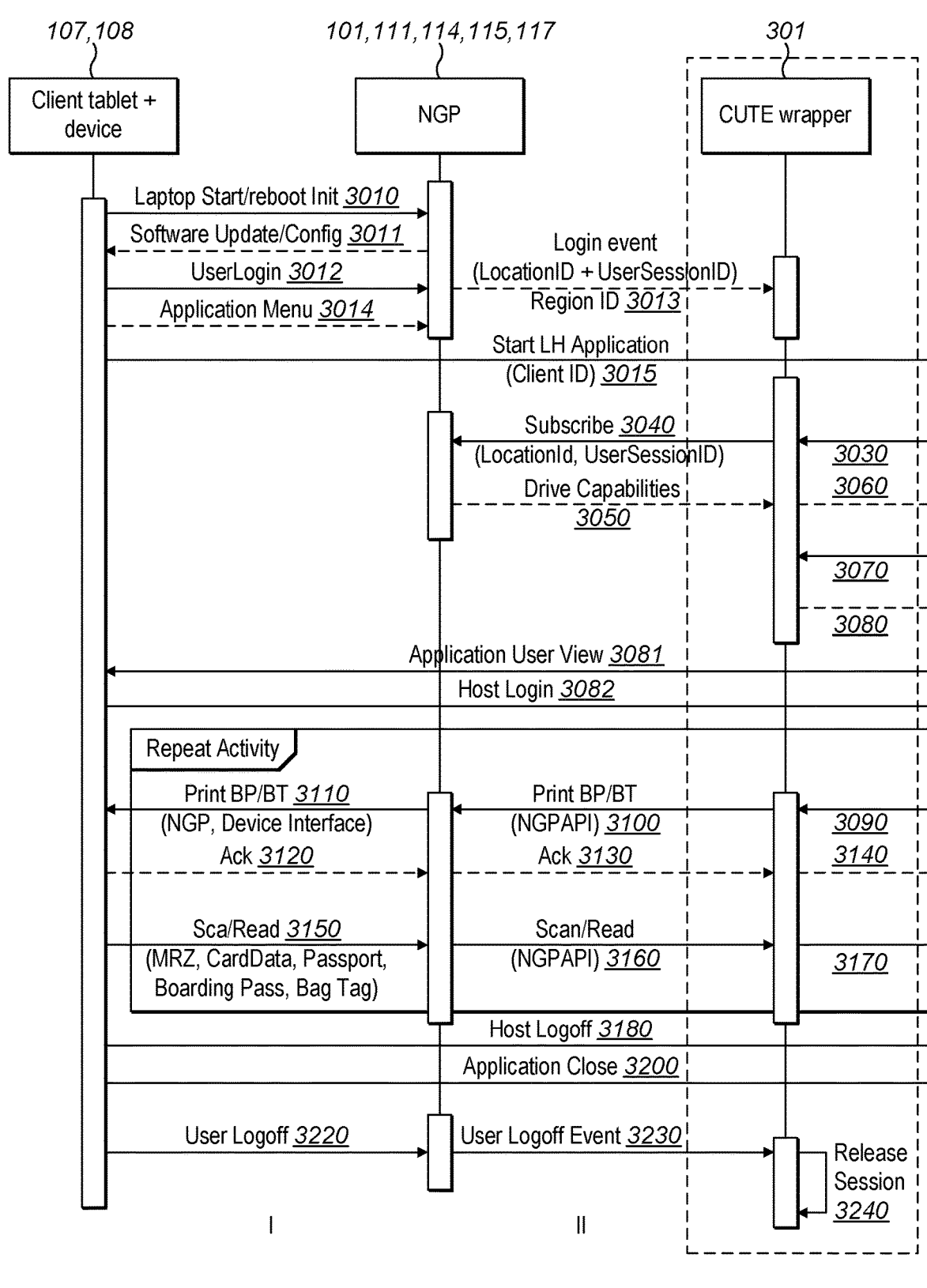
FIG. 3 is a flow diagram showing the sequence flow of various different functional components according to an embodiment of the invention.
Figure 3:
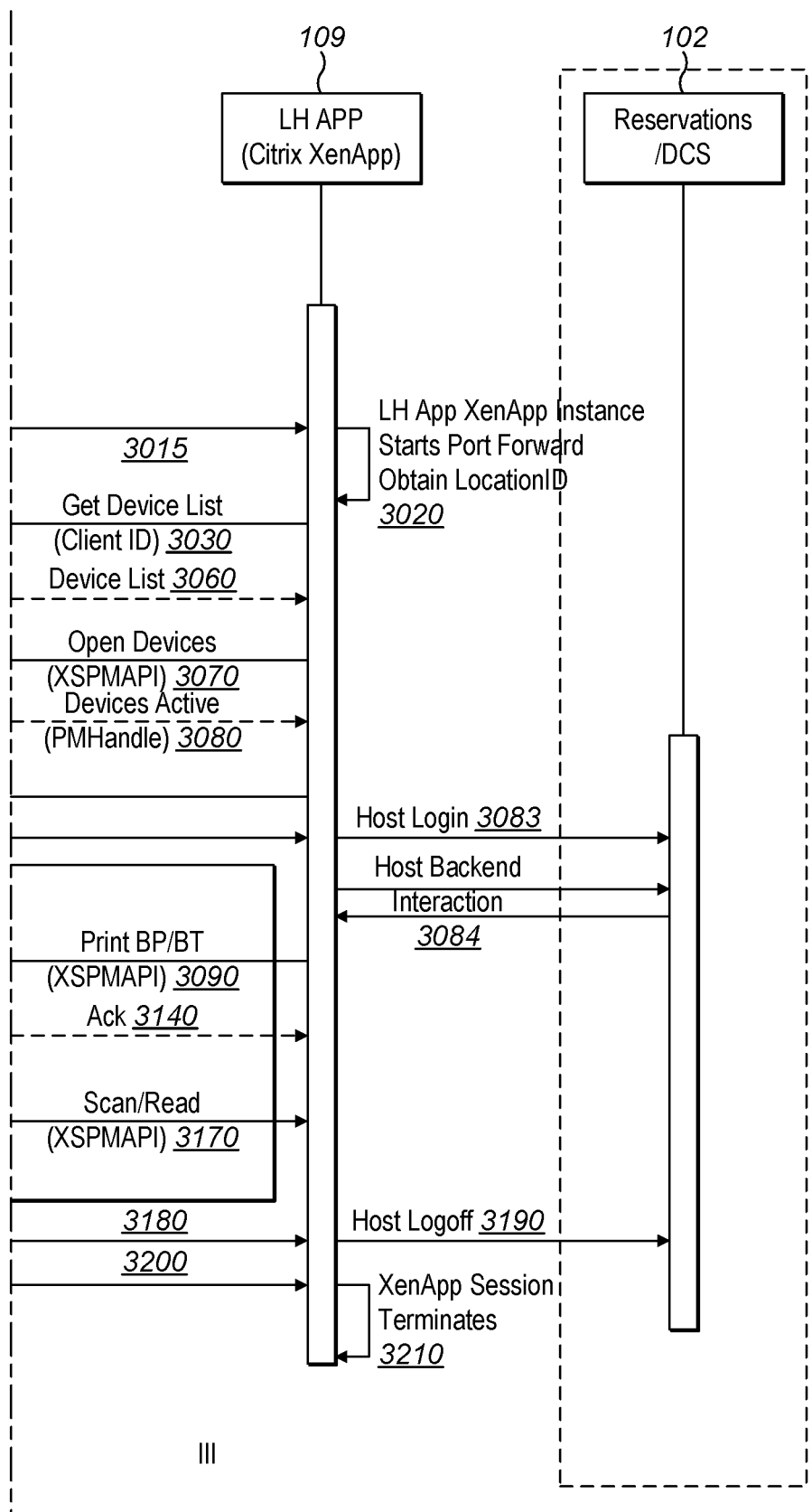

An API 301, shown in FIG. 3 of the drawings, may also be provided and located in the API environment 103. This is referred to as a CUTE Wrapper API. One of the functions of the application 301 is to translate between the different protocols used. Further, the application 301 may also translate commands between the API environment 103 and the remote application environment 109. In addition, the API performs an authentication function to check that messages 122 received from the remote application environment are associated with a genuine user. The CUTE Wrapper API is particularly useful when integrating legacy airline applications for use into the NGP system. However, it is of course optional, and the airline applications may be configured to directly receive messages from the NGP system, within the need from the CUTE Wrapper API 301.

Description of Data Exchange Between Functional Components

In FIG. 1, data exchange between different functional components is represented by the arrows labelled 121, 122, 123, 124, 125, 126, 127, 128, and 129. Of course, for clarity purposes, not all of the communications between the different functional components are shown. However, these further details are described in detail below.

In one specific example, the messaging 121,122 between the API services 111 and the respective, and usually associated, applications 141, 143 in the remote application environment shown in FIG. 1 may be implemented using Java Script Object Jotation, JSON™ xml messages. This is a data-interchange format based on Java™ Script programming language. These are described in further detail with reference to FIG. 3 of the accompanying drawings below. Of course, other messaging protocols known to the skilled person may be used.

Detailed Description of Beacon Placement and Functionality

As previously described, the beacon 110 is usually placed in close proximity to the location where one of the user devices 107 may be used. Alternatively, a matrix barcode, such as a one dimensional bar code, a Quick Response, QR, code or 2-D bar code may be used. In this case, a location identifier is encoded within the QR code or within the 2-D bar code. These codes allow information to be encoded within them. This is described in further detail below.

A beacon identifier value may be associated with each beacon. This may be set up with a companion application such as a beacon management tool. The user device 107 may use wireless signals such as Bluetooth to communicate with the beacon 110.

Usually, each of the user devices 107 comprises an application for allowing access to the shared infrastructure. This application, which may be in the form of an API may be executed by the user, airline agent or passenger when they approach the shared infrastructure 108.

The application is usually configured to detect one or more of the beacons 110 by way of wireless communications protocols such as Bluetooth. Once the application has detected a beacon's UUID, this is sent to the API environment 103.

The beacon identifier or UUID data, may, for example, be a 32 digit alpha numeric code. The code may for example be in the format 1 AE18C1 C-6C7B-4AED-B166-4462634DA855 which is associated with a beacon. The API may also return one or more of majorId=14, minorId=2. In another specific example, the API 106 may return one or more of UUID=1 14A4DD8-5B2F-4800-A079-BDCB21392BE9, majorId=1 100, minorId=1292. majorId and minorId may be used to distinguish between beacons in a particular area having a common UUID. The API 106 may return data associated with one or more beacons.

Description of UUID's Stored in Database 104 are Mapped to Location Identifiers

Within the API environment 103, a Beacon 110 identifier-to-location identifier ID mapping may be performed as a service. Thus, as part of the initial configuration process, a beacon identifier and a location identifier are passed to the API environment. The location identifier may be in the form of an alphanumeric string such as "JFKT5CK01" which indicates that the beacon, and therefore the user device 108 is located at John F Kennedy Airport, Terminal 5, Check-in Desk 01.

A mapping between each beacon identifier and a location identifier is performed, and the association or mapping is stored in the database.

Thus, the database comprises at least one beacon identifier associated with a location identifier. This allows a link to be made between the beacon identifier and a user device 107.

The database may also include local airport environment map. This allows for a visual representation of the physical location of the beacon(s) 110, as well as the associated user devices 107 which are near each beacon 110.

In one specific embodiment, the database 104 may include data defining an airport map and locations of beacons and associated shared devices 108 within the map.

Further Description of Location Identifier

As previously described, the Location Identifier, ID, may be thought of as an association or link between the device communication channel 124 and the GUI communication channel 125 shown in FIG. 1.

Further, a number of different associations between the communication channel 124 and communication channel 125 and one of the applications 141, 143, 145 running in the remote application environment 109 may be provided. This allows a user to use multiple locations.

As outlined above, the location may be determined with use of a beacon, NFC, or a label. The Location Identifier, ID, may be parsed by a back-end service.

The description below focusses on further details of the Location Identifier, ID, concept. The location identifier may follow the format of any one of the following examples:
1. BOH-PREPROD-T01-GATE01-WKS-001
2. JFK-T01-GATE03-WKS-002
3. MIA-ADM-FLR1-CONF1-WKS-001

EXAMPLE 1

In this example, the Airport=BOH, Area=preproduction, Terminal=1, gate=1, and Work Station=1.

EXAMPLE 2

In this example, the Airport=JFK, Terminal=1, Gate=03 and Work Station=2.

EXAMPLE 3

In this example, the Airport=MIA, Area=administration, Floor=1, Conference room=1 and work station=001.

These examples define a relative location or a location which may be at any location within one or more predetermined areas. The location identifiers may define areas, regions or volumes within two dimensional or three dimensional space. The two or three dimensional space may be defined by one or more x, y or z coordinates which are associated with each area or space. The coordinates defining each area or space may be stored in a data base, such as database 112, along with the associated location identifier defining each area or space.

In the above examples, the location identifier may define different regions. Usually, at least some of the different regions overlap with one or another or are may be contained wholly within another region. Thus, and airport may be thought of as a region 1, an administration area may be thought of as a sub region 2, and a conference room may be thought of as a sub-region 3 of sub region 2. Sub region 3 may be wholly contained within sub region 2. Similarly, sub region 2 may be wholly contained within sub region 1.

The location identifier may define the location of a particular device 107 such as a work station as part of a hierarchy. In a specific example, the actual work station may be a kiosk or a bag drop work station of one or more of these.

This hierarchical structure is extremely flexible and provide human readable text format. Further, a database of area acronyms and associated explanations of those acronyms may be provided.

It will be appreciated that the location identifier does not define locations relative to a single point of origin. This is in contrast a coordinate system such as a longitude and latitude coordinate system in which all locations are defined relative to a single point of origin. Rather, each location identifier is associated with a predetermined location. A hierarchical tree defining the location relative to each predetermined location is provided. This has the benefit that the location identifier may be interpreted by the skilled person and the hierarchical structure understood without the need to refer to a database of acronyms. This allows for the hierarchical structure to be easily expanded as necessary.

For example, suppose a check in kiosk is deployed in Times Square, New York.

The location identifier may be defined by NYC-TSQ- . . . .

The location identifier may be communicated between different functional components as a text string.

The string may be searched. The logical structure of the location identifier is usually only traversed when the tree is created. The tree may be viewed by way of a GUI on a workstation. The GUI shows how the location identifier defines a nested structure.

Thus, the location identifier usually start with an IATA defined code specifying location such as JFK, LGA, LAX or a well-known abbreviation of a location such as NYC.

As the hierarchy is built, each step is added to the Location Identifier, ID, which renders it human readable and understandable. This provides a very accurate view of the physical location of the workstation. When the location identifier is defined with sufficient precision such that the workstation is actually located, a marker may be added. The marker may be referred to as a WKS marker and then an identifier may be added which defines the workstation number. This scheme can be used to depict virtually any location is the world.

Description of Device Type or Generic Device Label to Distinguish Between Different Types of Shared Devices 108

If a location ID is associated with multiple shared devices 108, then the device types previously described may be used to distinguish between different devices at a particular location. Alternatively, a unique device identifier may be used to distinguish between different shared devices 108.

This may be done by associating one of the shared devices 108 with a particular location identifier and the device type label. Example of device type labels are ATP, BTP, LSR, MSR as previously described.

Thus, each device 108, such as a bag tag printer or a bag tag scanner for example may be identified by its location identifier and device type label. As previously noted, the labels are usually generic, but the combination of location identifier and label provides a way to identify one device from a number of different shared devices 108 which may be at a particular location.

The specific way of uniquely determining which shared device 108 a particular a message is sent to may be performed in 2 Different Ways.

As a first option, the shared device 108 may be uniquely determined based on the location identifier and the device type label, such as ATP, BTP LSR.

As a second option, the shared device 108 is uniquely identified using the beacon UUID which is mapped to the location identifier JFKT5CK01 and label ATP. This means that the location of the shared devices 108 is the same or similar to the location of the user devices 107. The beacon identifier, such as beacon UUID may provide a link or association between the shared device identifier or label and location identifier.

Figure 2:
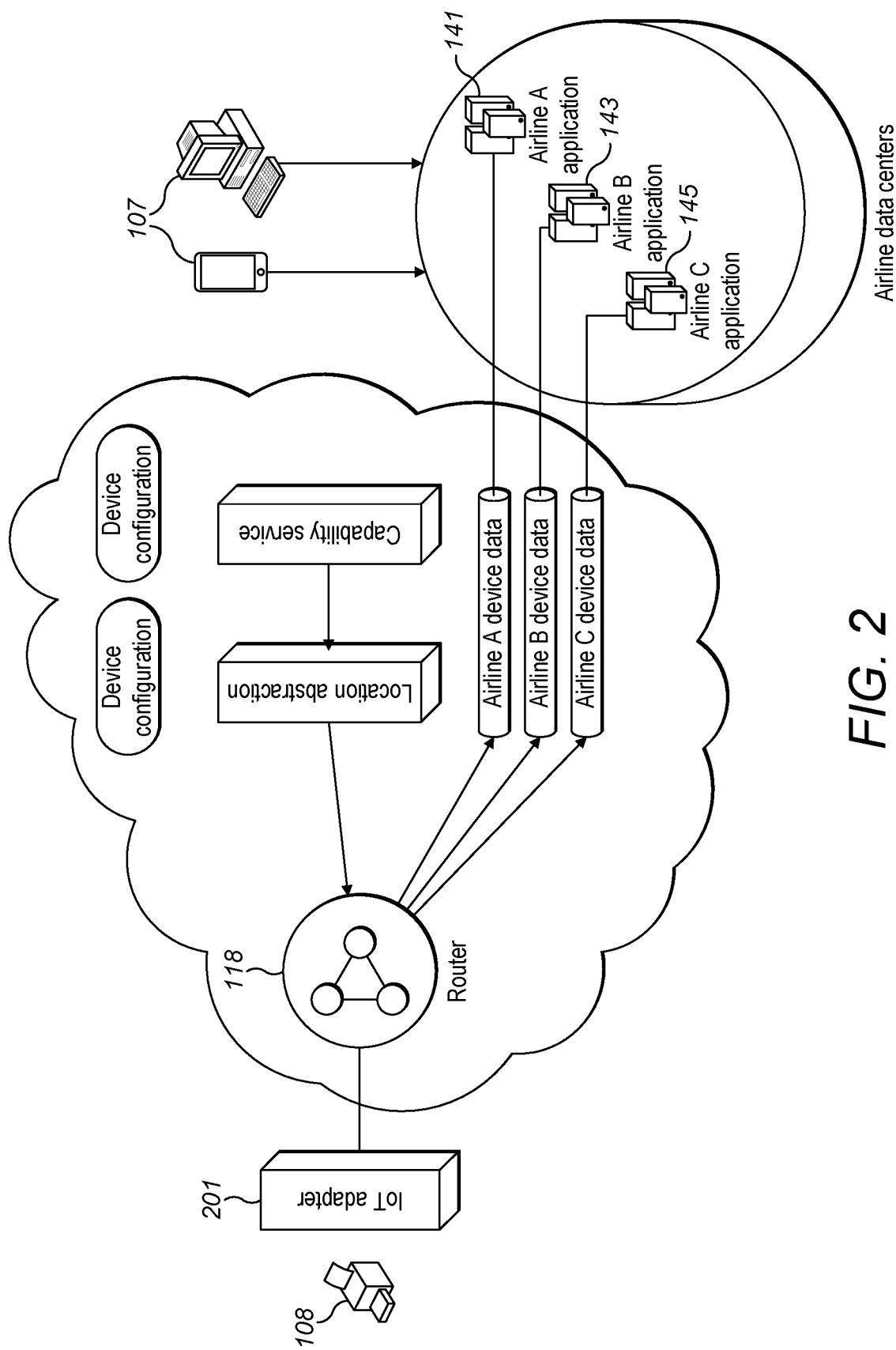
FIG. 2 is a schematic diagram showing the system architecture of an embodiment of the invention.

FIG. 2 of the drawings shows a schematic diagram of a specific embodiment in which an adapter 201 is provided. This adapter is provided for current devices at the airport 107 which are not capable of connecting to the cloud 203 IoT-Hub directly. Thus, an adapter service is used to allow a legacy device to function as an IoT device. This adapter together with device interface is published to allow device vendors to develop devices that have native IoT support. The adapter 201 shown in FIG. 2 may also be referred to as a field gateway, FG shown in FIG. 1 of the drawings.

The location ID abstracts the position of a device to a logical placement, e.g. check-in desk, hotel lobby, without knowing knowledge of connected workstations or IT layout. The Location Identifier is described in further detail below.

The message routing from devices to the airline/airport applications and from airline/airport applications to the devices is handled by the unique internal routing mechanisms and Azure routing mechanisms. The routing mechanisms are described in further detail below with reference to FIG. 3 of the drawings which shows a sequence flow diagram of an embodiment of the invention.

The IoT Adapters, Location Abstraction and Capabilities Services deliver a distinctive solution for managing and operating devices on a global scale while bounding the complexity of device hardware, capabilities and message routing within the cloud application.

Detailed Description of Device Services Interface API 117

A device services interface API, 117 may be provided within the API environment

The device services interface API 127 provides an interface with any one or more of the shared devices 108. This allows the services which any one or more of the shared local devices may perform to be listed, and made available for use by any one of the user devices 107.

For example, supposing the shared device 108 is simply a printer coupled to a networked work station. The device services API 117 indicates that the device can perform printing.

Further detail regarding the nature of the printing may be provided by the device services API. For example, it may indicate that the printer is capable of printing a bag tag which can be attached to a passenger's luggage. Similarly, the device services API may indicate that the printer is able to print a boarding pass in a particular format or size or following a particular style sheet or table. For example, a boarding pass printer may print a boarding pass using a PECTAB print language. In this, data to be printed on the boarding pass is formatted according to one or more tables.

In any event, the configuration portal 115 is communicatively coupled to the device services interface 117. This is schematically illustrated with the arrow labelled 128 in FIG. 1. Thus, the configuration portal 115 is also communicatively coupled to the capability services interface.

Configuration of Workstations and Associated Peripherals

Before describing the sequence flow diagram of FIG. 3 in detail, the optional configuration of workstations and associated peripheral devices such as bag tag printers or boarding pass printers will be described.

Workstations with peripherals connected to the workstation may be deployed using the following steps. This assumes that the workstation is running for example Windows 10 and has the required device drivers pre-loaded on the image.

After a work station or portable device has started at step 3010, an installation engineer starts a browser and enters an NGP URL to connect to NGP portal. The installer is usually required to enter security credential to start the installation process. The NGP portal provides intuitive GUI to guide the installer to connect and configure peripherals. This process automatically installs and configure all necessary software on the workstation based on a location ID provided by the installer at step 3011. Usually, the NGP Installation Portal GUI requires the Installer to test all peripherals for validation of successful installation. The peripherals may in principle be any shared device 108 such as a boarding pass printer or bag tag printer.

A user then enters a specific URL in the browser running on user device 107 to access the NGP system. Usually, each airline has a different URL to access the system.

Referring now to FIGS. 1 and 3 of the drawings, the messaging sequence flow will now be described. It will be appreciated that the specific order of the steps is exemplary and that the steps may be performed in a different sequence to that shown in FIG. 3.

The following description assumes that the user has previously created an account with the NGP system so that the user has a user name and password stored in the system which allows access to the system. Further, it also assumes that the device 107 is enabled with a browser to connect to the NGP portal, which provides access to the API environment.

Usually, the term API environment 103 is used interchangeably with the term NGP portal or system. It also assumes that one or more peripheral devices such as a bag tag printer or boarding pass printer have been configured as previously described.

Portable Device Solution

In some examples, an airline agent may bring a portable computing device such as a tablet to an airport counter, kiosk, or Bag Drop location to perform for example a check-in or boarding pass issuing functionality. Similarly passengers using smart phones/tablets can approach kiosks or other locations to print boarding pass, bag tags and make payments directly from their own devices. Passenger will usually run a particular airline application to perform these functions. This allows a passenger to have seamless experience at the airport.

As outlined above, the beacons, using for example NFC technology, allow a device 107 to associate with shared devices 108 at the counters and inside the kiosks and the bag drops.

The association of particular beacons with shared computing devices, or in other words, location identifiers, ID's associated with shard computing devices 108 has been previously described above.

The Location Identifier, ID links, or associates the 2 channels 124, 125. This informs the platform about which printer in the local airport environment 107 the application 141, 143, 145 in the remote environment needs to communicate with.

When a user logs-in from tablet or other device 107 a predetermined Location Identifier is sent to the API environment 103. Alternatively, when the user logs-in, they may manually select their location. The location may be determined using a beacon or using Near Field Communication, NFC, or a QR label, as outlined above. In this way, airline agents may bring their own tablets and simply approach airport counters, kiosks, Bag Drops and other locations to perform check-in and boarding functions.

The tablet may be associated with one of the devices at the counters (at for example a kiosk or bag drop) using for example a beacon or NFC. This allows the device to receive a Location Identifier, ID, and for the portable device to pass the Location Identifier on to the API environment 103.

Thus, a user may bring a portable computing device 107 to the local airport environment 105 to access the API environment 103.

The user launches an application on the device 107 which detects the beacon 110 which is nearby the user using wireless communications protocols, such as NFC to detect a beacon identifier, such as UUID.

The application running on user device 107 may wirelessly send a request to the search API 106 located in the API environment. The request includes the UUID, and the request includes a command which instructs the API 106 to search the database 104 for beacon identifiers stored in the database which match the beacon identifier detected by the API running on the user device 107.

Once the API 107 has determined a match between the UUID identifier associated with the detected beacon and a beacon identifier stored in the database, then the API 106 searches the database for location data or in other words a location identifier, ID associated with the matching beacon identifier stored in the database. The particular format of the location identifier, ID, is described in further detail below.

Fixed Counter Solution

As an alternative to the portable device solution, the user may use a work station, also labelled as 107 in FIG. 1, to access the API environment. This is referred to as a fixed counter solution. In this example, the location ID is passed to the airline's back end service transparently. The user does not have to take any action to obtain the location ID.

Thus the fixed counter solution may perform the following steps:

1. When the fixed location workstation is installed and the Field Gateway is deployed the workstation is given an identity. Usually, this identity is the location ID.

2. When user logs in to the NGP system to access his/her applications, the location ID is passed as part of the login credentials.

3. The NGP system may then dynamically build a menu with application icons that is displayed to the user where each icon is a URL associated to the backend airlines application services 141, 143, 145. The URL has three associated parameters; LocationID, UserSessionID and NGP URL.

These parameters provide all the information needed by the airline's backend application services 141, 143, 145 to subscribe to the location needed by the user logging in.

Detailed Sequence Flow Steps and Messages

Unless indicated otherwise, the different functional components shown in FIGS. 1 and 3 may be implemented using an API call, such as a Representational State Transfer, REST, API call using an http protocol.

Thus, data within the messages shown in FIG. 3 is usually in the format of an alpha-numeric string and an associated field defining the type of data, which may also be in an alpha-numeric string format. Further, the different functional components shown within the API environment 103 and application environment 109 may be implemented as different modules which are coupled to one another to exchange data as necessary between the different modules.

Referring now once again to the sequence flow diagram of FIG. 3, the user is prompted to enter a user name or user ID and password (UserLogin) to login to the NGP system. A user login message 3012 is therefore sent from the user device 107 to the API environment 103. The user login prompt is usually in response to the user entering a specific URL in the browser, as previously described.

If the NGP API environment is provided as part of a cloud service, then any authentication steps required by the cloud service provider may be used. Usually, a number of users are provided with access to the system and groups of users may be defined as belonging to particular associations or companies, such as a particular airline.

In order to access the particular URL the user device may be provided with a security certificate. The security certificate may be provided over a separate channel, and the certificate may be revoked at any point. Access to the NGP system is usually not allowed unless the appropriate security certificate has been provided.

The Authentication services 114 then authenticates the user based on the credentials entered by the user.

After user login, the configuration portal 115 or authentication services application 114 determines whether the user is associated with a particular group of users, such as those belonging to a particular airline. This may be performed by searching a database 112 of logon credentials which may a particular company or group identifier associated with them, such as an airline identifier.

If the user is using a portable device, the location of the portable device may be determined at this stage. This may be performed by the application running on the client tablet or device 107 instructing a scanner or reader associated with the device to scan for or read a beacon identifier, as previously described, for example using wireless Near Field Communication protocols. Alternatively, the application installed on the mobile device may be used in conjunction with reading means such as a camera to read or scan a QR bar code. The beacon or QR bar code is usually placed in predetermined positions within the airport where a user may wish to use user shared infrastructure. In the case of the QR bar code, the bar code comprises data defining the location ID encoded within it. Alternatively, the user may simply enter the location identifier manually once he is prompted to do so.

If the mobile device reads a beacon identifier, the beacon identifier is sent to the API environment from the user device 107 via wired or wireless connection. Then, the application 106 searches the database 104 to locate a beacon identifier corresponding to or matching the beacon identifier read from the beacon 110. The API 106 then determines a location identifier stored in the database 104 which is associated with the location identifier matching the beacon. Thus, the API 106 is able to determine a location identifier associated with the beacon. Usually, all of the functional components shown in FIG. 1 of the drawings are able to access a location identifier, ID associated with a particular beacon identifier when needed. The determined location ID may then be transmitted back to the user device 107.

Thus, the NGP system and usually, the API 106 running the application environment receives the location ID from the fixed work station, or the API 106 running within the API environment 103 determines the location ID by searching the database 104 for a location identifier which matches a particular beacon identifier. This is usually in response to the API 106 receiving the beacon identifier from the user device 107.

In either case, an association between the location ID and the particular user device 107 accessing the shared infrastructure 108 is made. The user device 107 may have an associated identifier.

After the user has successfully logged in to the API environment 103, at step 3012, a login event message 3013 is sent from the Authentication services interface 114 within the NGP portal to the CUTE_Wrapper API 301. Usually, the login event message 3013 comprises data identifying a user location in the form of the location ID and a user session identifier, referred to as a user_session_ID. The user session ID may be generated by the authentication services API, 114. As will be known to the skilled person, the user session ID identifies a user session and may be an alphanumeric string.

The login event message may comprise an optional airline ID or user group identifier, ID. A region identifier, such as "US", East-US", "West-US", "Netherlands", "Ireland", and "Asia" may also be used. This is useful if for example multiple different instances of the API environment need to be provided in different locations, and thus allows a global solution to be provided. The data within the event message may be in an alphanumeric string format.

In one specific example, the user_session_ID incorporates data defining a user and data defining association or group with which the user is associated. For example, the data defining the association may be a string such as "BA" or "AA" which may define an airline as "British Airways™" or "American Airlines™" respectively. Other associations, for example such as ground handler associations may be linked to the user. Usually, the URL used to access the NGP system is used to map, associate or provide a connection between the location ID, user session ID and the airline ID.

At step 3014, the user is provided with a menu, referred to as an Application Menu, based on the logon credentials and the determined location ID. This may be done by one of the API's within the API environment 103 (such as the authentication services API 114) sending a call to the user device 107. Usually, the application menu is provided as a URL (which may be an alpha-numeric string) which points to the corresponding URL of the application 141, 143, 145 in the remote airline application environment 109. Thus, the menu may provide functionality which allows the user to perform one or more different functions, using the user device, at the particular local airport environment. Two specific examples of functions which may be performed by the user using the user dices at the local airport environment 105 may be the printing of a bag tag or a boarding pass using one or more shared devices 108.

Thus, using one of the user devices 107, a user is able to click on one of the menu items, and this allows connectivity to the application in the remote airline environment. A CITRIX™ application may be used to perform this step, although other applications may be used to remotely launch one of the applications 141, 143, 145 from one of the devices 107 in the local airport environment 105.

The step of displaying a menu of items and functionality to allow the remote launch of one of the applications 141, 143, 145 may be performed using an application in the API environment 103 (for example using one of the API's 111), which may be referred to as an NGP portal application to search a database 112 of stored preconfigured settings defining the types of applications available to the user at the particular location. This application may first authenticate a user and then determine what applications should be available to the user when logging on using the client device 107 at a particular local environment 105.

Thus, the NGP portal application 103 is able to determine what applications have been previously configured for this user, based on the location. In a similar manner, an airline may remove applications for user based on the user id and location.

This is analogous to the way in which specific devices, such as a bag tag printer or boarding pass printer may initially be configured, at step 3011 for user at a specific location, for example using the configuration portal 115. This allows specific devices 108 in the local airport environment to be configured for specific users and for those devices and services to be published.

An airline may configure the desired applications 141, 143, 145 which are available to a specific user at a specific location by logging on to the configuration portal 115. The database 112 associated with the configuration portal API 115 may store settings which define the type of application a particular user, identified by their user id has available when logging on at that specific location. For example, a user may have applications for printing a boarding pass or printing a bag tag configured to be available when they log on. This may be performed based on a user ID and location.

Thus, exemplary applications may be a boarding pass application or bag tag application which allows an agent or passenger to print or process a boarding pass or bag tag.

The application menu allows the user to select one of the available applications 141, 143, 145 in the remote application environment 109 (LH_Application). This may be performed by way of a published and subscribed communication between the NGP API system 103 and a CUTE Wrapper application 301, shown in FIG. 3 of the drawings.

Usually, the CUTE_Wrapper application is located in the remote application environment 109. The CUTE Wrapper Client application 301 may act as an intermediary between an airline's legacy applications 131, 134, 145 and the applications 111 in the API environment.

One of the functions of the application 301 is to translate between the different protocols used. Further the application 301 may also translate commands between the API environment 103 and the remote application environment 109. Thus, the CUTE wrapper application 301 may be optional depending upon the application type being used in the remote airline environment. Nevertheless, the core data exchanged between the NGP API environment 103 and the application in the remote airline environment 109 is usually the same irrespective of whether a CUTE wrapper application is used.

In response to the user selecting one of the applications 141, 143, 145 indicated in the menu, the user device 107 then communicates with one of the applications 141, 143, 145 in the remote application environment 109 to start one of the applications 141, 143, 145 using message 3015. As outlined above, the step 3015 is performed using a link to the application in the remote airline environment 109. Thus, one of the applications 141,143,145 in the remote airport environment is launched based on the information received in the message 3015, such as the client or user identifier.

It should be noted that usually, the link or message 3015 does not allow for any associated parameters to be sent, other than a URL. Thus, at step 3020, when the specific application 141, 143, 145 in the remote airline environment 109 is started using the URL, one of the remote airline applications also usually makes a local call to the local CITRIX environment to determine a client identifier which may identify the device 107 which started a particular user session.

Thus, when the CUTE wrapper functionality is used, usually, the previously determined location ID is not sent to the application 141 in the remote application environment.

Rather, when one of the applications 141, 143, 145 in the remote environment 109 is launched, the application instance starts a port forward. This allows one of the applications 141 to receive a client ID because the local CITRIX environment passes the client identifier to the application 141 running in the remote application environment. This is usually sent from the user device 107 to the application 141 via the CITRIX interface in response to the user device 107 receiving such a request from the application or CITRIX interface in the remote application environment 109.

For example, a client ID may identify a particular user by name, and identify the type of device being used to launch the remote application 141, 143, 145. Thus, the client ID may be in the form of "NAME_TABLET_1". The client or user device 107 communicates the client ID to the CITRIX environment (which is usually within the remote application environment), for example by communication means 129. The previously described user login is usually associated with a particular client identifier, IDs.

At step 3030, the application 141 sends a Get Device List message 3030 to the CUTE wrapper API 301. The device list message includes the determined client ID, usually as an alphanumeric string.

The CUTE Wrapper API 301 then performs a mapping of the received client ID to the previously determined location ID. Usually, the received client ID is uniquely associated with a particular user and hence with a device used by that user.

The Get Device List message 3030 sent by one of the applications 141, 143, 145 in the remote application environment to the cute wrapper API 301 instructs the cute wrapper API to provide a device list associated with the particular application 141 which has been launched.

Usually, the message 3030 includes the determined client ID and data defining the type of document to be processed, such as a boarding pass or bag tag. Thus, the message 3030 may comprise text such as alpha-numeric text in the form of "BP" or BT" which indicates that a boarding pass or bag tag respectively are to be processed.

Once the CUTE wrapper API 301 receives the message 3030, it examines the message contents to determine the client ID and the type of document required. Further, the CUTE wrapper API 301 also has knowledge of the user session ID which is associated with that particular location ID, because the user session ID may be stored in a storage means within the API environment for use by the cute wrapper API 301.

CUTE Function of Mapping of Client ID to Location ID.

The CUTE Wrapper API may perform a client ID to location ID mapping.

To perform the mapping, the CUTE Wrapper API 301 uses the information received in the login event message 3013. Thus, the Cute Wrapper may use the location ID and session identifier received in message 3013 to map the received client ID to an associated location ID.

This may be done by searching a database (such as database 112 associated with the configuration portal) for a client ID which matches the client ID received in message 3030. The matching client ID stored in the database is associated with a location ID or/and user session ID for a particular user. Similarly, a mapping of client ID to location ID may be performed for fixed the work station solution.

Thus, the CUTE Wrapper API 301 translates the client ID (which may be associated with a particular user or device) received in message 3030 into a location ID (which may be associated with the particular user or device).

At step 3040 the CUTE wrapper API 301 sends a location subscribe message 3040 to the configuration portal 115 in the API environment 103 to subscribe to a particular location via one of the API services 111, using the location ID determined by the CUTE Wrapper API 301. Usually the location subscribe message comprises parameters defining the location ID and User Session ID.

The API configuration portal service 115 may transmit an acknowledgement in response to receiving the location subscribe message 3040, although this message is not shown in FIG. 3 because of its optional nature.

Step 3040 is performed because usually an airline, and hence users registered to use the system, need to subscribe to a location before device operation can be requested. The following should be noted:

- Subscription is implicitly linked to a user session. In other words, during the configuration process, when an airline application is subscribed to or associated with, a location, it is assumed that an airline agent is using the application 141 in question. Hence Subscription requests are usually mandated to have a corresponding user session ID.
- One user can usually ONLY have one active subscription per location; however, the user can initiate multiple subscriptions across locations through the airline application
- One airline can have multiple users or agents subscribe to a location through the airline application(s) 141, 143, 145.
- Subscription is controlled by airline having access to the location. A scheduler may be used to enforce this based on one or more rules.

The location subscribe message 3040 usually comprises the location ID and User session ID information and optionally an Airline ID parameter. As previously described, the Location ID parameter defines the location identifier of the workstation or portable device 107 being used, the user session ID defines the logged in user session ID, the Airline ID may define an airline codes, such as an IATA airline code and there are usually defined by alpha-numeric strings. Optionally, a time stamp may also be included in the sample JSON location subscribe request message 3040 shown below:

| Parameter | Type | Optional/Mandatory | Description |
| --- | --- | --- | --- |
| AirlineId | string | Mandatory | IATA Airline code |
| LocationId | String | Mandatory | Location Id of the workstation |
| ConnectionId | String | Mandatory | GUID for Subscribe calls to NGP |
| UserSessionId | string | Mandatory | Logged in User session id |
| Timestamp | DateTime | Mandatory | Airline service Timestamp in UTC |

Sample JSON Request Format

TABLE 1

Exemplary structure of the location subscribe message 3040.

```
{
  "AirlineId" : "LH",
  "LocationId" : "LAX-T1-GateB21-WKS-001",
  "UserSessionId" : "372d4802-8ede-47a6-aa73-5cb2850a3d2c",
  "Timestamp" : "2016-08-10T08:45:01:511Z",
  "ConnectionId" : "8B5FFA7E-9045-414B-B44B-426FE21C5F51"
}
```

The API service 111 in the NGP API environment 103 receives the message 3040 and communicates with the device services interface 117 via messages 131 and 132 to determine the particular devices associated with a particular location as well as the associated capabilities of each device. Information may be included in the message which allows it to be routed to one of the API's 111 shown in FIG. 1, if more than 1 API service 111 is provided.

Thus, the device services interface API 117 and configuration portal 115 communicate with one of the API services 111 in the API 103 environment to determine a list of devices associated with a particular location ID, and their associated capabilities.

This may be done by searching the database 112 using a particular application. The database 112 includes details of the devices 108 which are associated with the particular user location or more precisely, the location identifier.

The device capabilities are returned to the CUTE wrapper API 301, which is usually part of the API environment 103.

The CUTE wrapper API 301 translates the received device capabilities in to a JSON message type, shown as 121, and 122 in FIG. 1 and message 305 in FIG. 3.

An exemplary JSON location subscribed response message 3050 is shown below:

| Parameter | Type | Optional/Mandatory | Description |
| --- | --- | --- | --- |
| AirlineId | string | Mandatory | IATA Airline code |
| LocationId | string | Mandatory | Location Id of the workstation |
| Timestamp | DateTime | Mandatory | |
| SubscriptionId | string | Mandatory | Unique identifier for each subscriber |
| MessageId | String | Mandatory | MessageId from the Request (CorrelationId) |
| SubscriptionChannel | string | Mandatory | Service Bus URI |
| AuthenticationToken | string | Mandatory | Token for accessing Service Bus. |
| LocationCapabilities | object | Conditional | This element represents the currently configured capabilities of the device. Only currently configured capabilities will be returned as part of the response |
| ConnectionId | GUID | Mandatory | ConnectionId for the subscribe call |
| Error | Object | Conditional | Contains error details if interface call status is 'Error' |

-continued

| Parameter | Type | Optional/Mandatory | Description |
| --- | --- | --- | --- |
| Code | String | Mandatory | Error Code |
| Status | string | Mandatory | If success it will give Success else Error |
| Description | String | Mandatory | Error description detail |

Sample JSON Response Format—on Success

TABLE 2

An exemplary JSON location subscribe response message 3050.

```
{
    "AirlineId" : "LH",
    "LocationId" : "JFK-T1-Gate1-WKS-001",
    "Timestamp" : "2016-08-10T08:45:01.511Z",
    "Status" : "Success",
    "SubscriptionId" : "53DE9585-2148-4E66-B5DE-03686F140363",
    "MessageId" : "F95DC8D9-FF11-4983-A833-4DC6F64512F7",
    "SubscriptionChannel" : "<Service bus connection string>",
    "AuthenticationToken" : "3A70ACCD-1181-4DA6-99DD-3FBD3BC408F6",
    "ConnectionId" : "8B5FFA7E-9045-414B-B44B-426FE21C5F51",
    "LocationCapabilities" : {
        "ReadBoardingPass" : {
            "LSR1" : {
                "Status" : "Online",
                "Locator" : "JFK-T1-Gate1-WKS-001-LSR1",
                "errorCode" : ""
            },
            "BGR1-LSR" : {
                "Status" : "Online",
                "Locator" : "JFK-T1-Gate1-WKS-001-BGR1-LSR",
                "errorCode" : ""
            },
            "LSR3" : {
                "Status" : "Online",
                "Locator" : "JFK-T1-Gate1-WKS-001-LSR3",
                "errorCode" : ""
            }
        },
        "ReadBagTag" : {
            "LSR2" : {
                "Status" : "Online",
                "Locator" : "JFK-T1-Gate1-WKS-001-LSR2",
                "errorCode" : ""
            },
            "LSR4" : {
                "Status" : "Online",
                "Locator" : "JFK-T1-Gate1-WKS-001-LSR4",
                "errorCode" : ""
            }
        },
        "ReadMagneticCard" : {
            "MSR1" : {
                "Status" : "Online",
                "Locator" : "JFK-T1-Gate1-WKS-001-MSR1",
                "errorCode" : ""
            },
            "BGR1-MSR" : {
                "Status" : "Online",
                "Locator" : "JFK-T1-Gate1-WKS-001-BGR1-MSR",
                "errorCode" : ""
            },
            "MSR2" : {
                "Capability" : "MagneticCard",
                "Locator" : "JFK-T1-Gate1-WKS-001-MSR2",
                "Status" : "Online",
                "errorCode" : ""
            }
        },
        "ReadTravelDocument" : {
            "OCR1" : {
                "MRZ" : {
                    "Status" : "Online",
```

TABLE 2-continued

An exemplary JSON location subscribe response message 3050.

```
                    "Locator" : "JFK-T1-Gate1-WKS-001-OCR1",
                    "errorCode" : ""
                },
                "FullPage" : {
                    "Status" : "Online",
                    "errorCode" : ""
                },
                "ImageOnChip" : {
                    "Status" : "Online",
                    "errorCode" : ""
                }
            },
            "BGR1-OCR" : {
                "MRZ" : {
                    "Status" : "Online",
                    "Locator" : "JFK-T1-Gate1-WKS-001-BGR1-OCR",
                    "errorCode" : ""
                },
                "FullPage" : {
                    "Status" : "Online",
                    "errorCode" : ""
                },
                "ImageOnChip" : {
                    "Status" : "Online",
                    "errorCode" : ""
                }
            }
        },
        "PrintBoardingPass" : {
            "ATB" : {
                "Status" : "Online",
                "Locator" : "JFK-T1-Gate1-WKS-001-ATB",
                "mediaStatus" : "OutOfStock,LowStock etc.,",
                "errorCode" : ""
            }
        },
        "PrintBagTag" : {
            "BTP" : {
                "Status" : "Online",
                "Locator" : "JFK-T1-Gate1-WKS-001-BTP",
                "mediaStatus" : "OutOfStock,LowStock etc.,",
                "errorCode" : ""
            }
        },
        "PrintDocument" : {
            "DCP" : {
                "Status" : "Online",
                "Locator" : "JFK-T1-Gate1-WKS-001-DCP",
                "mediaStatus" : "OutOfStock,LowStock etc.,",
                "errorCode" : ""
            }
        },
        "Gate" : {
            "BGR1-Gate": {
                "Status" : "Online",
                "Locator" : "JFK-T1-Gate1-WKS-001-BGR1-Gate",
                "errorCode" : ""
            }
        }
    }
}
```

Usually the device capabilities response message 3050 defines the type of shared devices available such as boarding pass reader (BPR), Bag Tag Printer, (BTP), Boarding Pass Printer (ATB), and each device has an associated location ID.

The cute wrapper API 301 then uses the information received in response message 3050 to produce a device list message 3060 which defines the devices available at a specific location.

The device list message 3060 may comprise data defining the type of document to be printed or more usually the type of printer required to print a document type. For example, ATP may indicate that a boarding pass printer is required to print a boarding pass. BTP may indicate that a bag tag printer is required to print a bag tag printer. LSR may indicate that a boarding pass reader is required to read a boarding pass.

Thus, the application running in the remove airline environment 109 is able to receive a list of available devices in the remote location. This list of available devices is sent to the via communication means 129, or 123, or 125, for example via the web proxy functionality 113 within the API environment. The user is able to select, using the user device 107 one of the available devices to print a particular document type.

In response to the user selecting one of the devices to print a particular document type, the application 141 in the remote environment then sends an open device(s) message 3070 to the CUTE Wrapper application 301 to open one of devices in the device list. If only one device is returned in the device list message 3060, then the CUTE Wrapper API 301 generates a single PM Handle associated with the desired device. Usually, the PM Handle uniquely identifies a particular device, within a particular user session.

The Cute Wrapper 301 API 301 returns a PMHandle parameter to the application 141 in the remote application environment 109.

If the device list message 3060 identifies more than one device 108, then usually a different PM Handle parameter is generated for each different device, and usually, each parameter is unique to a particular session.

Thus, each device request coming from LH_APP 109 is managed as a separate session that is identified by the PM Handle.

Message 3070 may be in the form of an XSPMOpen Call for each device based on the device configuration list received (3060). This creates session with device, returns PMHandle. The elements of the call may include any one or more of: PMRET PMENTRY XSPMOpen (PSZ DevName, PPMHANDLE PPMHandle, ULONG OpenOption, PSZ AirlineID, SHORT DataWaitTime, ULONG Reserved).

The CUTE Wrapper API 301 usually creates a PM handle which may be unique to a specific session. The PM handle may uniquely identify one of the shared devices 108. The PM Handle is usually returned to the remote API 109 using message 3080.

The message 3080 is usually sent in response to the XSPMOpen call.

The message may comprise any one or more of the following code elements: PMSaveHandle, ChangedDataFlag, RequestType, Length, CRC, SequenceNumber, AppPMHandle, SaveAppBuffer, ChangedDataFlag, ActivityFlag, NotifySem, IPCHandle, AppBufferAddr, Command, PMHandle, ReturnCode, Status, LocalFlags, Version, DeviceName, AirlineID, UserName, OpenOption, WksName, ExtStatus, DevDwnFlushTime, DataWaitTime, Reserved CUTE Functionality of Mapping Specific PM Handle to Device Identifier, ID When handling a specific print request, the CUTE Wrapper API 301 includes functionality to translate the PM Handle defining the particular device which an application 141 is configured to use, in to a device Identifier ID. In once specific example, the device ID may comprise a determined location ID and an associated label. The mapping may be performed by comparing a stored PM handle associated with a particular device, with stored data defining a location ID and device label.

As outlined above, message flows 3030, 3060, 3070, 3080 may form part of a single user session. Thus, the stored PM handle(s) are usually updated each time a new user session is initiated.

Messages 3081 and 3082 are schematic in the sense that the show that the subsequent steps below usually only occur in response to a specific request from the user device 107 to print a specific boarding pass or bag tag for a passenger, or to read a specific passenger boarding pass. Thus, the subsequent steps may be initiated by a user requesting a specific action to take place.

Messages 3083 are also schematic and show how the application running in the remote airline environment may log in to a remote reservations or departure control system. This is optional as any passenger data, such as PNR data associated with a specific passenger, may be stored within the system 100.

Example of Printing a Boarding Pass or Bag Tag

The following example focuses on the specific example of an agent or passenger using an application running on a device 107 to perform the function of printing a boarding pass or a bag tag at a shared device 108 using an application 141, 143, 145 running in a remote application environment 109 which communicates with the local airport environment 105 via the API environment 103.

This assumes that certain passenger data, such as a particular passenger's name has been read, from for example a passport or otherwise entered into an application running on one of the user devices.

This information allows a reservations or departure control system, DCS 102 to uniquely identify a passenger's booking and to identify the data to send back to application 141, 143, or 145.

Usually in order to uniquely identify a particular booking, the DCS 102 uses the combination of the a credit card number used to make the booking and the passenger's name.

For example, the first four and last six digits of a credit card number as well as the associated name may be used to identify a particular booking. Alternatively, passport data, such as a name and date of birth may be used to uniquely identifier a passenger's reservation. Further, a reservation locator such as a reference number may be used to uniquely identify a passenger's reservation.

Once a particular passenger's reservation has been identified in the back end DCS 102, this allows data associated with the particular passenger's PNR to be determined. Thus, the system is able to determine which airport the passenger is flying to using an airport identifier, the time of flight, the flight number and seat issued for example. This data allows a boarding pass to be issued for a particular passenger.

Further, if the passenger has checked-in baggage, then the DCS creates an identifier in the form of a Licence Plate Number, LPN for that baggage. The DCS returns the baggage information, airport identifier, and flight number and any associated or linked LPN for a baggage to the airline application environment 109.

Thus, the remote application 141, 143, 145 may retrieve a Passenger Name Record, PNR reservation stored in a database. This is usually created when a passenger's booking is created. As a large number of PNR's may be stored in the database, each PNR is identified by a record locator.

Usually, each PNR comprises any one or more of a passenger's name, ticket details such as a ticket number, an itinerary of at least one segment of a journey, and the name of the person providing the information or making the booking. The itinerary may be defined by a departure airport code (such as New York, N.Y.C) (an arrival airport code (such as London Heathrow, LHR), a scheduled departure date and time, and a scheduled arrival date and time.

This allows a boarding pass or bag tag to be issued by a departure control system, for example using scheduled departure flight time and departure airport location.

It will be appreciated that bag tags and boarding passes may be defined in IATA RPS documents such as IATA Resolutions and RPs (Recommended Practices) such Baggage Tag IATA Resolution 740 and RP1740a, and Boarding Pass IATA Resolution 722e and RP1723.

A confirmation is usually provided to the GUI running on user device 107 that a particular passenger record has been located. Further, the data retrieved from the departure control system 102 is returned to one of the applications 141 in the application environment. The API service 111 provides an acknowledgement to one of the applications 141 that the data has been successfully received and performs a routing function to route the data to the correct service within the device service interface.

At step 3090 the particular application 141, selected for use by the user using the user device 107, sends a print boarding pass or bag tag message 3090. This may be done using XSPMAPI messaging/communications. This defines libraries and communications used by legacy applications.

Usually, the data included within the print boarding pass or bag tag message 3090 is based on an AEA format.

Usually, the message 3090 defines the type of operation to be performed, such as print a boarding pass or bag tag. Further, the message comprises data allowing the boarding pass or bag tag to be printed. Usually, this data comprises a passenger name, but may comprise any one or more of the information outlined above with reference to defining a boarding pass or bag tag.

Usually, the message 3090 for printing a boarding pass or bag tag uses a legacy protocol based on PECTAB to provide a layout for the boarding pass and bag tag. Message 3090 is sent using TCP/IP socket communication based on C-language structure.

The payload structure of the message includes data elements which are necessary to print a boarding pass or a bag tag. For example, the message may include passenger name, flight number, gate and seat number in an alpha-numeric format. The message is mapped to a PECTAB template. The data message 3090 is structured in such a way that fields do not need to be identified. The message may include a field defining the particular PECTAB template which should be used.

Message 3090 may be in the form of an XSPMWrite call. The call may include details of the document to be printed, such as a boarding pass or a bag tag. The call may include one or more commands, such as Association of European Airline Commands such as PMRET PMENTRY XSPMWrite (PMHANDLE PMHandle, PPMDATABUFFER PPMBuf, ULONG WriteOption, HEV Semaphore, ULONG Reserved) which will be known to the skilled person.

The CUTE wrapper API then translates message 3090 in to a format which is suitable for processing by the NGP system to generate message 3100.

The message 3100 is based on an html template, boarding pass or bag tag data and a template and the CUTE Wrapper API 301 generates for example a print image message 3100.

Message 3100 is usually based on JSON using key value pairs and is communicated using a web API. The cute wrapper analyses message 3090 to identify particular fields such as fields defining gate number or seat and is able to distinguish between these fields.

The cute wrapper API 301 shown in FIG. 3 maps data from the legacy protocol of message 3090 to the protocol of message 3100. In other words, cute wrapper API 301 translates message 3090 into key value pairs, and may also add information stored by the system 103. The cute wrapper API transforms message 3090 by using an html template for layout of boarding pass for example.

The cute wrapper service 301 then creates a print boarding pass or bag tag message 3100 which is sent to the API environment 103, for example using a JSON message. This may be thought of as a translation of a legacy printing command to the new NGP print command and file.

An exemplary format of the print BP/BT message 3100 is given below:
PrintDocumentRQ:

| Parameter | Type | Optional/Mandatory | Description |
| --- | --- | --- | --- |
| AirlineId | string | Mandatory | IATA Airline code |
| LocationId | string | Mandatory | Location Id of the workstation |
| Locator | String | Mandatory | Device & capability locator FQN |
| SubscriptionId | string | Mandatory | Unique Identifier for each subscriber |
| TransactionId | String | Mandatory | Unique Identifier for airline to track multiple requests under a single business transaction |
| Timestamp | Datetime | Mandatory | |
| DocumentType | String | Mandatory | Possible values are: BagTag, BoardingPass BoardingReceipt, CustomReceipt |
| TemplateId | String | Mandatory | ID of the template to be used for printing |
| Params | Object | Mandatory | Contains Key value pairs |

Sample JSON Request Format:

```
{
    "AirlineId" : "LH",
    "LocationId" : "LAX-T1-GateB21-WKS-001",
    "SubsctriptionId" : "53DE9585-2148-4E66-B5DE-03686F140363",
    "Locator" : "JFK-T1-Gate1-WKS-001-BTP",
    "Timestamp" : "2016-08-12T08:35:49",
    "DocumentType" : "BagTag",
    "TemplateId" : "70CF33E2-B27F-4759-95D6-F061FFF92690",
    "TransactionId" : " 868A42EF-EAD2-492D-95C7-FF0011BF98D8",
    "Params" : {
        "Label1" : "Airline",
        "Label1_Value" : "LH",
        "Label2" : "Passenger Name",
        "Label2_Value" : "John",
        "Label3" : "Flight Number",
        "Label3_Value" : "LH137",
        "Label4" : "Departure",
        "Label4_Value" : "LAX"
    }
}
```

Thus, it will be appreciated that the message 3100 generated by the cute wrapper API may comprise a location identifier, ID (LocationId) and a device label. As previously described, the location identifier may comprise alpha-numeric data such as "LAX-T1-GateB21-WKS-001" or "JFK-T01-GATE03-WKS-002". In the exemplary print message 3100 shown above, the device label is in included in the "locator" field. From this, it can be seen that the shared device printer 108 is in fact a bag tag printer, BTP. However, a separate device label field and associated value may be provided in the message 3100 as for example key value pairs. Further the message 3100 may comprise any one or more of the fields shown in the above messages, for example, any of the data required to print a bag tag or boardingpass.

An exemplary print document acknowledge message 3130 is given below. The acknowledgement message 3130 may be sent by one of the applications within the API environment 103 to the cuter wrapper API 301:
PrintDocumentAck:

| Parameter | Type | Optional/Mandatory | Description |
| --- | --- | --- | --- |
| AirlineId | string | Mandatory | IATA Airline code |
| LocationId | string | Mandatory | Location Id of the workstation |
| Locator | String | Mandatory | Device & capability locator FQN |
| SubscriptionId | string | Mandatory | Unique Identifier for each subscriber |
| MessageId | String | Mandatory | Platform generated MessageId |
| TransactionId | String | Mandatory | Unique Identifier for airline to track multiple requests under a single business transaction |
| Timestamp | Datetime | Mandatory | |

Sample JSON Format:

```
{
    "AirlineId" : "LH",
    "LocationId" : "LAX-T1-GateB21-WKS-001",
    "SubsctriptionId" : "53DE9585-2148-4E66-B5DE-03686F140363",
    "Timestamp" : "2016-08-12T08:35:49",
    "MessageId" : "F95DC8D9-FF11-4983-A833-4DC6F64512F7",
    "TransactionId" : "868A42EF-EAD2-492D-95C7-FE0011BF98D8"
}
```

An exemplary document print request message 3110 generated by the one of the API's 131, 132, 117 within the API environment 103 is shown below. Message 3110 is generated based on the information received in message 3100 by one of the applications within the API environment 103. In the example message 3110 a unique device Id is provided which allows a particular device to be uniquely identified by the field "DeviceId". Data associated with the print message 3110 is also included below as "Command-Data" and may include any one or more of the data included in message 3100 required in order to print or process the document in question, for example to print the boarding pass or bag tag. The combination of the location identifier, ID and device label may be used to uniquely identify a particular device to which the print document request should be sent.

Document Print Request:

| Parameter | Type | Optional/Mandatory | Description |
|---|---|---|---|
| CommandType | String | Mandatory | Print |
| Command | string | Mandatory | Print, Config, ConfigPrint |
| TimeStamp | DateTime | Mandatory | Time in UTC |
| DeviceId | String | Mandatory | Iot Hub DeviceId |
| CommandData | String | Mandatory | Key/Value Pair, FileData |

Exemplary JSON Request Format:

```
"deviceCommand": {
        commandType: 'Print' ,
        command: 'Print' ,
        timeStamp: '2016-08-11T01:01:43+00:00'
        deviceId: '413dc6c0a03d4d6a9cd2c1==' ,
        commandData {
           "File": <FileData>
        }
    }
}
```

Exemplary JSON Request Format for Configuration:

```
"deviceCommand": {
        commandType: 'Print' ,
        command: 'Config' ,
        deviceId: '413dc6c0a03d4d6a9cd2c1==' ,
        timeStamp: '2016-08-11T01:01:43+00:00'
        commandData {
           "FontName": CourierNew,
           "FontSize": 12
        }
    }
}
```

A Globally Unique Identifier may be used as an alternative to using the location ID and device label in order to uniquely identify a shared device 108 to which the print message 311.

For example, during initial system set up, an application within the configuration portal 115 creates a GUID (Globally Unique Identifier) or in other words deviceId: '413dc6c0a03d4d6a9cd2c1=='. An API within the NGP system 103 may be provided which maps '413dc6c0a03d4d6a9cd2c1==' to Location ID and Device Label. The mapping of the device Id to location id and device label may be performed searching, using an API, data stored in a database.

Exemplary JSON Request Format with File Data & Configuration:

```
"deviceCommand": {
        commandType: 'Print' ,
        command: 'ConfigPrint' ,
        timeStamp: '2016-08-11T01:01:43+00:00'
        deviceId: '413dc6c0a03d4d6a9cd2c1==' ,
        commandData {
    "FontName": CourierNew,
    "FontSize": 12,
    "File": <FileData>
        }
    }
}
```

Document Print Response:

| Parameter | Type | Optional/Mandatory | Description |
|---|---|---|---|
| MediaType | String | Mandatary | Print |
| DeviceId | String | Mandatory | IoT Hub DeviceId |
| TimeStamp | DateTime | Mandatory | FieldGateway Time in UTC |
| MessageData | String | Mandatory | Key/Value Pair, Message Status & Device Success/Error message |

Exemplary JSON Response Format:

```
"deviceMessage": {
        mediaType: 'Print' ,
        deviceId: '413dc6c0a03d4d6a9cd2c1==' ,
        timeStamp: '2016-08-11T01:01:45+00:00' ,
        messageData {
           "Status": Success
           "MediaStatus": LowStock
        }
    }
}
```

| Status | Description |
|---|---|
| Success | Command Success |
| Failure | Command Failure |

| Media Status | Description |
|---|---|
| LowStock | LowStock Warning |
| Out of Stock | Out of Stock Error |
| Paper Jam | Paper Jam Error |

Thus, alternatively or in addition to the GUID described above, the combination of location ID and device label is used to uniquely identify which shared device the print boarding pass or bag tag message 3110 should be routed to. Thus, this message defines the device to send the print request to in the form of a Device ID. The location ID and label such as ATP may be mapped to the specific device ID.

The Field Gateway component, described in further detail below, may therefore store data defining the device ID, such as location ID and label. The field gateway component may also map this information to a specific port number, so that it can correctly determine which device to send the print message 3110 to.

The device services interface 117 selects the correct device service, such as printing a boarding pass or bag tag. This is done based on information defining the document to be printed. The selected service within 117 then selects the required template needed to print the data according to a format, such as a boarding pass or bag tag defined by a PECTAB format and encodes the received data according to the format. Thus, the AMQP message sent to the shared device may be sent with data encoded in a pdf format, also defining the document type such as boarding pass or bag tag.

In the case of legacy boarding pass printers and bag tag printers, an optional Field Gateway, shown as FR in FIG. 1, which routes the message to one of the shared locate devices based on the location identifier, and a device label, such as ATP. A certificate is also used. This translates the location ID and label, such as ATP to a unique device identifier.

In response to receiving a request message 3110 to print a boarding pass or bag tag, the shared device 108 may transmit an optional acknowledgement message 3120. As outlined above, the API 111 may also provide an acknowledgement message 3130 back to the one or more of the applications 141,143, 145 running in the shared airline environment that a request has been correctly received. The acknowledgements messages may be routed via the field gateway which receive acknowledgement message 3130 from the application 111 in the API environment.

As previously mentioned, the API service(s) 111 perform the function of determine the type of request received from the application 141 in application environment (for example print a boarding pass or a bag tag), determine which service in the device service interface 117 will handle the request.

Finally, the document is printed at one of the shared devices 108 in response to the device receiving the message 3110. The passenger or agent then collects the document for subsequent use.

This approach of having different device services within the device services interface 117 allows additional devices, such as payment devices, to be added without impacting system.

In addition to printing boarding pass and bag tags the other devices such as OCR, LSR, MSR and Boarding gates are supported using same methodology. In this example, the messages structure is shown as 3150, 3160 and 3170 in FIG. 3 of the drawings.

Closing Applications

The airlines agent will sign off to their DCS and close the LH_APP. This will end the LH_APP Citrix session with the CUTE_Wrapper service. The airline agent logs out from NGP and the client device returns to the login screen. NGP system then publishes a logout event to the CUTE_Wrapper service that allows the CUTE_Wrapper service to release all resources associated with the user session and the LH_App.

Detailed Description of Router 118 and AMQP Protocol Messages

Within the API environment 103, a router API 118 may be provided. This may perform a similar function to the API service 111. The router has the function of examining a message received from one of the device services interface 117. This has the function of routing messages 124 to the correct device 108 in the local environment.

The router 118 examines a message 124 received from the device services interface 117. This may be done by examining the message at a header information level which defines the device type. The header nay uniquely identify which shared device 108 a particular message should be communicated to.

Each of the shared devices 108 undergo a registration process with the API environment. As part of the registration process, each device 108 is issued a token. The token allows the shared devices 108 to connect the cloud 119.

The token is included in the message header of message 124 and by examining the token the router API 118 may determine which device in the local airport environment 108 the message should be sent.

The device services interface 117 also processes the information received by message 131 transforms the data into a pdf message format. The particular device services interface 117 transforms the received data into a pdf message format defining either a boarding pass or bag tag defined, for example, according to a PECTAB format.

Further, in one specific example the Advanced Message Queuing Protocol, AMQP message protocol is used to send the message from the device service interface 117, via router 118, and usually also via the cloud interface 119 to the shared device 108. This is described in further detail with reference to FIG. 3 of the drawings. AMQP is an open standard for passing messages between applications. The data unit of AMQP is referred to as a frame. Nine different frames are defined to initiate, control and terminate the transfer of messages. Messages are sent over a link using the transfer frame. Messages on a link usually only flow in one direction.

In the example shown in FIG. 1 of the drawings a Web Proxy service 113 is provided within the API environment. The Web Proxy service is usually communicatively coupled to both the remote application environment 109 (and hence to one of the applications such as 145 or 143 or 141 in the remove application environment 109) and the one or more user devices 107 shown in the local airport environment 105. The Web Proxy functionality may provide GUI connectivity to the airline applications. The Web Proxy service may also provide GUI connectivity to the tablet, workstation and kiosk display 107 in the airport environment.

However, the Web Proxy functionality 113 is in fact optional and in fact the user devices 107 may be directly coupled to the remote application environment 109 provided the local airport can access, via a communication means 129, the remote application 109 using wired or wireless internet protocols which will be known to the skilled person.

Description of Capability Services Interface

A capability services interface, not shown in FIG. 1 of the drawings, may also be provided. Usually, this functionality is provided within the device services interface 117. Alternatively, the capability services interface may be provided as a separate API service communicatively coupled to the device services API 117.

Boarding pass scanners often include capability to show light and emit sound. This provides an audio-visual indication to airline agents regarding whether or not a boarding pass has been accepted or not. This may be done by any illumination means such as an light emitting diode, and a loudspeaker means arrangement. The particular choice as to whether the scanner emits light or sound or both, an as well regarding the particular format of the light or sound emitted, such as the number of beeps and flashes is usually determined by the manufacturer of each device. In any case, these settings may be defined and changed via the configuration portal.

Thus, airlines still have full control of the configuration settings for shared devices, but this is done via the configuration portal 115, rather than via the interface.

This allows for the configuration to be remotely performed by airline for particular airport for a particular user so they can control the number of acknowledgement signals when a boarding pass has been accepted. This allows the device capabilities to be without that coming through interface. Thus, airlines are able to set up the configurations settings for the shared infrastructure via the configuration interface. This avoids the need to put configuration settings in the interface, and also avoids the need for the applications to know how the shared infrastructure interface works.

In a further example, regarding the use of shared infrastructure, when an airline agent scans a boarding pass, the configuration settings may be selected such that the device is locked until the scanning device receives a response from back end systems regarding the validity of the boarding pass.

Thus, the configuration settings may be chosen so that after a boarding pass has been scanned, a visual indication is provided to indicate that additional scans of boarding passes may not be performed. For example, if an LED light is used, this may change to a red colour to indicate that additional scans may not be performed.

The capability service interface determines the type of data and data configurations required by each of the shared devices 108. Usually, a database 112 is provided which stores capability settings and configuration settings associated with each device.

Thus, the device interface 117 can be suitably configured to interact with each of the shared devices by searching the database of physical devices or in other words, a master list of physical devices 112 and their associated capability and configuration settings. Capability or/and configuration settings may vary based on airline preferences and optionally based on location.

Subscriber airlines may view the database of device capabilities and modify it via the configuration portal 115.

To illustrate the above, in one specific example, suppose an airline agent uses a shared boarding pass reader to scan or read a passenger's boarding pass, as the passenger is boarding an aircraft.

Certain data is read from the boarding pass, such as the passenger name. This data will be referred to as boarding pass data. The passenger name, in conjunction with any one or more of the current date and time and airport code may be sufficient for one or more back end systems, such as a departure control system 102 to perform a check that the boarding pass includes data which corresponds to the passenger in a Passenger Name Record, PNR database.

If the boarding pass scanned by the agent is accepted, the departure control system 102 sends a boarding pass acceptance message to the remote application environment 109. This is received by one of the applications 141, 143, 145 in the remote application environment and passed via 121 to the API service 111, and then from the API service via 131 to the device service interface 117. The device service interface 117 then passes this message via 124 to the shared scanner 108 device.

The scanner device may indicate that the scanned boarding pass has been accepted by the departure control system by provide one or more indicators. These indicators may take, in principle, any form since device manufacturers and airlines may configure default settings based on their own preferences. However, for example a scanner may indicate that the boarding pass has been accepted by illuminating a green LED, or/and optionally producing a series of beeps or audio indicators.

It is the capability service API, labelled as CS in FIG. 1 which obtains this device capability data from a database. The capability services API is usually located within device services 117.

Usually a list of devices is provided. The list may identify a particular device. Associated information defining the device capability may be provided, for example indicating that the device can read a boarding pass or bag tag. Configuration settings are usually defined for each device. These may relate to relate to specific configuration settings which indicate whether a particular boarding pass has been accepted by a back-end departure control system. In one specific example, the settings may define the number of flashes of and LED or number of sounds emitted by a loudspeaker device to confirm that the boarding pass has been accepted. Usually, specific subscriber airlines will define specific configuration settings they wish to use.

The capability services are usually configured as part of initial system configuration when the shared devices 108 are configured for shared use. Part of the configuration process is to list physical shared devices 108 which are available at the local environment 105.

Once a determination has been made as to which shared devices 108 are available at the local environment 108, then the physical capabilities of each device are determined. Thus, for each device 108 a list of associated physical capabilities is defined. The capability settings and configuration settings associated with each device are usually stored in database 112.

For example, suppose the shared device 108 is a DESCO™ VGR device. This device may have any one or more of the following capabilities: passport reading/scanning, boarding pass reading/scanning, credit or debit card reading/scanning, or a gate function.

By gate function, we mean the process which is usually performed by an airline agent to check a passenger boarding pass by scanning it with a reader and sending data associated with the boarding pass to a back end system such as departure control system. Thus, data such as a name and seat number may be read from a DCS and sent back to the shared device. The agent may then manually check that the information determined from the DCS matches the information on the boarding pass.

From the above, it will be appreciated that this VGR device has 4 configured capabilities. Thus, for an application which has subscribed to a particular location having such a VGR device, all of the above capabilities are listed.

It will be appreciated that the gate function controls access to boarding of the airplane.

As part of the Gate function, the following steps may occur:

Scan or read a boarding pass;
The device is configured to then illuminate a red light which indicates that the device is locked. This prevents others from scanning until the back-end DCS is able to access a database.
Once the DCS has performed a check that the data read from the boarding pass corresponds to a validly issued boarding pass (for example the passenger name and seat number read from the boarding pass corresponds to the data stored in the DCS), an acceptance command may be issued by the DCS and communicated to the device. Receipt of an acceptance command may be signalled by a green light, or by one or more audio indicators.

These may signal to the agent that the DCS has confirmed that a valid boarding pass with a particular passenger name and seat number has been issued.

The agent may also perform a cross check to confirm that the boarding pass information shown on the boarding pass matches the passenger data shown on the passport or identity card.

As a second example, a device may be an ACCESS™ VGR device. This device only has a single capability, namely to function as a gate function, and it is not able to read a passport or credit card read. Thus, if a particular application in the remote application 141, 143, 145 environment has subscribed to this device at a particular location, then this single capability is listed against this device.

For each device shared device 108 associated configuration information is stored. For example, the configuration settings may relate to particular settings chosen to provide an audio or visual confirmation of an acceptance message, such as the particular choice regarding the number of bleeps, such as 1, 2 or 3 to indicate that the boarding pass has been accepted.

This configuration information is communicated via the message 124. This is in contrast to known systems in which such device configuration information has to pass through all of the functional components by way of the messages 125, 123, 121, and 131

The capabilities services interface provides the individual device services as defined by the device capabilities rather than device make and model. This abstracts the management of the device and any knowledge of physical devices from the airline/airport application. This involves the enumeration and segmentation of a vast number of device capabilities and the individual assignment to a master list of physical devices. Thus a database or list of devices (which may be deployed as one of the shared devices 108 in the airport environment) capabilities) may be provided. The list or database may be stored in storage device 112. Similarly, database 104 may be stored in a storage device.

Thus, it will be appreciated that the key functionality provided is to integrate future devices with API data without the need of change to applications and utilizing capabilities of future devices to provide rich experience to the user.

The API's 111 provide managed and controlled access for airport devices 107, 108 to the applications 141, 143, 145 in the remote airport environment 109 based on the interface and configuration settings. Airport administrators may independently configure the devices 107, 108 and airport applications 141, 143, 145 in the API Configuration Portal thus making it available for the airlines, ground handlers and other entities operating in the airport locally or remotely. The airlines administrators may independently configure users and applications and assign them to devices at the airports making it immediately operational. Airlines and airport administrators can create additional administrators and delegate some or all responsibilities.

Description of Multiple Different Users at Same Location Sharing the Same Shared Infrastructure Embodiments of the invention may handle multiple different users of different user devices which are at the same or similar location, and which may wish to use the same shared device. This is achieved by providing a set of rules regarding how devices are shared between more than one user. In the case of a printer, the rules may simply allow more than one different user to connect to the printer and print jobs are scheduled in the order they are received.

Regarding shared infrastructure such as a scanner or credit/debit card reader, the rules may need to be more precisely defined. For example, an application requesting use of such a scanner or reader may be required to send a request to the reader to establish if device is available.

Multiple different users may each share the data channel 124 and Graphical User Interface, GUI channel 125 shown in FIG. 1.

Thus, it will be appreciated that a rules engine may be used to govern the rules sharing of devices between different airlines and inter-airlines, as well as between different users belonging to the same or different airline. For example, it will be appreciated that check-in devices may be shared with different airlines, but however, for a shared kiosk to be accessed by a user, the device must be in an idle state.

Addressing Backward Compatibility

A unique feature of the solution outlined above is the ability to accommodate an airline's legacy applications and the standards surrounding legacy devices, and still provide many of the benefits to customers mentioned above. This is achieved by having peripheral communication and airline application delivery following separate paths in the platform.

Existing airline applications are delivered to the end station from the Microsoft™ Azure™ cloud using a server-based computing technology, rather than requiring a local installation.

Calls from legacy applications to the previous system's API are routed through a software translation layer that injects messages into the new platform and delivers responses in the correct format. This allows legacy applications to be used without extensive modification.

Peripheral traffic is therefore separated from the application that generates it, allowing for a more flexible delivery/deployment model.

Legacy peripherals often require complex PC hardware deployed on site to support their operation. Our platform provides for the management of these end stations from Azure-based systems rather than relying on extra equipment deployed at the point of service.

Customers can access their legacy applications either from a traditional fixed airport position, or from a remote Internet-connected location.

When this data is received, it may be parsed.

NGP Interfaces

The platform exposes the core functionality from two logical perspectives: the customer perspective (airline, airport, operator etc) and the device/location perspective. These interfaces are unique in a way that they provide a complete access for an entity to perform all their processes whilst their operation and implementation is much simpler known systems.

Airline/Airport Interface

Embodiments of the invention may have the following advantages: very simple airline interfaces, complete device functionality exposed through this simple interface, roaming and mobile capability, simple ubiquitous web applications, extremely flexible and powerful configurations, smart directly connected devices, no workstations, and high security.

The airline and airport interface forms the core services the customers may access and utilize. The interface, through abstraction, provides a simple layer through which the airlines and airports access the device, security, configuration and monitoring services. The platform services in turn implement many checks and balances, some of which are configured by the airline, the airport and others by the platform. The interface, although simple, hides several layers of complex interaction with the platform which ensures authorization, authentication and validation of users, requests and data. The intelligent platform also monitors itself through machine learning technologies to understand the expected behaviour, monitors any deviation and is able to perform corrective actions.

Description of Machine Learning Module

In one specific embodiment, a machine learning or deep learning module may be provided within the API environment 103. The machine learning module may perform stream analytics. This may monitor the communications between the remote application environment 109 or the local airport environment 105 or both. For example, a specific behaviour, such as the number of passport documents being read, by one of the shared devices 108, per minute may be determined. If the number is greater than a predetermined threshold, then, a flag may be provided. This may allow an operator to review the behaviour and decide whether the behaviour should be allowed. Access to the API environment may be denied in response to determine that the number of reads per minute is greater than the threshold. Similarly, the machine learning module may be configured to monitor the number of readers or scanners receiving a message from the API environment. Similarly, if this value is greater than a predetermined threshold, then this may indicate a security breach of the system. S, access to the API environment 103 may be denied based on the determination. Thus, a library of acceptable behaviour patterns may be produced for each shared device 108 and user device 107.

All device functionality is exposed through uniquely designed higher level interfaces. These interfaces are designed for industry wide utilized legacy devices which normally have old interfaces, such as serial, and strict latency and message requirements (link layer).

Platform Interface

The platform exposes several internal interfaces which are utilized in order to implement platform functionality such as: Device services, Location services, Security services, Monitoring services, Logging services, Management services, Configuration services etc. A unique messaging structure has been designed in order to carry the requisite data to and from the platform in either direction either from Cloud to Device (airline to device) or Device to Cloud (device to airline). Built in mechanisms are created in order to calculate message latency for performance measurements and provide corrective actions if the latencies reach a performance limit. Platform interface also abstracts complex monitoring solutions built underneath which provides access to platform wide information on operations, functionality and business processes. This information is available in real time, across the globe to all partners and customers utilizing the platform. The platform makes it possible for airlines to continue to utilize existing business processes, software and hardware and yet still be able to acquire all the flexibility, management and maintenance capability always desired in this environment.

Field Gateway Service

A field gateway service, shown as FG in FIG. 1 of the drawings, download package is usually triggered in response to connecting to the configuration portal 115. As part of the package download, an associated security certificate downloaded with package as well. One the location identifier, ID has been determined as outlined above, the location ID is passed to the field gateway service. The field gateway service connects to the API environment 103 The field gateway uses the downloaded certificate and previously determined location ID. Thus, the field gateway uses the certificate and determined location ID to connect to configuration portal. This allows the configuration portal to determine the particular configuration needed for devices at this location.

The configuration service 115 receives a request from the field gateway, and uses the determined location ID to determine what devices are associated with a particular location and the particular configurations needed for those devices.

All device labels are registered in the IOT hub and a token is associated with each label, and thus device.

The field gateway service allows for legacy bag tag printers and boarding pass printers to be remotely connected. The port which a printer is assigned to determines whether the printer is a boarding pass printer or a bag tag printer. For example, bag tag printers are usually assigned to port 07.

Thus, the field gateway service may determine the type of printer based on which printing port the printer has been assigned to.

Field gateway used for legacy devices such as custom bag tag and boarding pass.

The combination of the field gateway, device certificate, location ID, and device label allows one of the shared devices 108 to be uniquely selected.

The following provides further description of how a particular device, such as for example a boarding pass or bag tag printer may be uniquely identified using the location ID and a device label (LocationID.Device_Label). It has particular application for older legacy printers or devices which may need to be compatible with the system, method and device for providing access to shared infrastructure or devices.

In this example, the field gateway functionality, FG shown in FIG. 1 of the drawings may comprise a module or API which may be installed on a work station which may be part of or coupled to one of the shared devices 108 shown in FIG. 1 of the drawings.

During configuration, an agent with suitable credentials launches a portal, usually on the work station. The work station is communicatively coupled with the API environment 103 via wired or wireless communications protocols. A list of possible location identifiers, retrieved from the database 104 is communicated to the portal. The list is usually returned in response to a request for location identifiers. Usually, the location identifiers are associated with particular regions, areas or more particularly zones within particular airports.

The user then selects a particular location identifier which matches their current location, for example, a location identifier "MUM-T1-SBD-001" may be recognised by the user as being associated with Mumbai airport, terminal 1, self bag drop area 001.

Another example of a location identifier is "JFK-T1-GATE1-WKS-001" which may be recognised by the user as being associated with US airport, John F Kennedy, Terminal 1, Gate 1, workstation 001.

Alternatively, the user may scan a beacon 110 which is placed in close proximity to the location where the work station and associated shared device 108 are positioned.

The device_label may take the form of "MSR" may indicate that the device is a Magnetic Swipe Reader used to read a credit card, or loyalty card. Other device types or labels may be BTP indicating that the device is a Bag Tag Printer or Boarding Pass Printer, referred to as ATP (Automated Ticketing and Boarding Printer) which indicating that the device is a Boarding Pass Printer, as previously described.

The selected location identifier is then communicated to the API environment 103. The API environment then generates an initialization file which may comprise any one or more of the following fields:

Initialization File Contents:
{
   "locationId":"JFK-T1-GATE1-WKS-001",
   "authToken":"seyqoeuqwsjfsdkfhsdfuishfs===",
   "configServiceUrl":"https://sita-ngpconfigservice.website.com/"
}

The initialization file may be encrypted using PGP sign and stored under an Azure Blob storage container ('FgInitFile' container) or storage means or data base 104. Under this container, there may be a sub container for each location [FgInitFile_<LocationId>.lck]. This file will is usually stored and accessed with an SAS token with an expiry of 4 hrs.

The user is then prompted to download the initialization file. The initialization file is also usually copied to USB drive manually. This should be done before token expires.

After launch the Field Gateway component searches for the initialization for file which may be named 'FgInitFile_*.*.lck'. If the field gateway component successfully finds the Initialization file it sends a request to location service, which may be part of the API environment 103 to obtain the security certificate for each shared device 108 or service running on the work station. To obtain the security certificate, the Field Gateway component or service calls the Location Configuration service, which may be part of the API environment 103, to get the certificate.

When the Location service receives the request for security certificate it validates the token (to confirm for example that the token is valid and that it has not expired). The location service may also validate the LocationId or in other words check that the received locationId corresponds to one of the previously stored locationId stored in the database 104.

Usually, if both the token and the locationId is valid, then the location configuration service contacts the certificate authority server to obtain the security certificate. Subsequently, the location service sends the public key to the field gateway component.

Once the certificate is installed on the workstation the field gateway component calls a register certificate API to add this certificate in an active directory or database. The above described process for downloading an initialisation file and obtaining a certificate may be performed for each workstation service or shared device coupled to the work station.

Once certificate installed in FG it will call the configuration service 'GetDeviceConfiguration' to get the device configuration. Device configuration initially will have only Workstation Deviceid and its key to communicate with IoT, other device details will not be there as device statues are in 'Not Configured' state.

Usually, the Filed gateway functionality locally stores or caches the locationId' in a memory for future calls to the configuration service.

From the foregoing, it will be appreciated that the location identifier of a work station (and therefore associated shared devices (108) connected to a work station) as well as a Device_Label may be used to uniquely identify a particular shared device to be identified. Thus, this may be used to determine which device particular printing requests should be sent based on the location.

In some implementations, shared devices, such as bag tag printers or boarding pass printers may be associated with particular ports of a work station. For example, boarding pass printer may be associated with "Port 1" while a bag tag printer may be associated with "Port 2". In some implementations, particular device types are always associated with particular port numbers—for example boarding pass printers may always be associated with port 1, while bag tag printers may always be associated with port 2.

Thus, it will be appreciated that the shared devices interact with the platform on IoT protocols such as the messaging protocol MQ Telemetry Transport or Message Queue Telemetry Transport (MQTT). In order for this to be possible with existing, legacy devices which may not have any internet based interfaces and higher level messaging protocols, are interfaced with the Field Gateway. The Field Gateway implements device level functionality and manages complex security interaction with the platform to ensure verified devices get to interact by fetching encrypted tokens and applying them to device communications. The Field Gateway also takes several local actions based on device data in order to provide a fast experience based on predetermined configurations.

From the foregoing, it will be appreciated that the mobile communication or device may include a computing device, such as a desktop computer, a laptop computer, a tablet computer, a personal digital assistant, a mobile telephone, a smartphone, an internet enabled television, an internet enabled television receiver, an internet enabled games console or portable games device.

It will also be appreciated that this invention finds application as a system for processing a user or customer, a device such as a portable device for use by an agent for processing the customer or a device such as a portable device for use by the passenger, as well as a method or computer program for processing the customer or passenger. In addition, this invention finds application as a system for providing services to a customer or user which may be used by an airline agent or other transport services provider agent.

The server may comprise a computer processor running one or more server processes for communicating with client devices. The server processes comprise computer readable program instructions for carrying out the operations of the present invention. The computer readable program instructions may be or source code or object code written in or in any combination of suitable programming languages including procedural programming languages such as C, object orientated programming languages such as C #, C++, Java, scripting languages, assembly languages, machine code instructions, instruction-set-architecture (ISA) instructions, and state-setting data.

The wired or wireless communication s networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface.

Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

Exemplary embodiments of the invention may be implemented as circuit board which may include a CPU, a bus, RAM, flash memory, one or more ports for operation of connected I/O apparatus such as printers, display, keypads, sensors and cameras, ROM, a communications sub-system such as a modem, and communications media.

The flowchart of FIG. 3 illustrates the operation of an example implementation of systems, methods, and computer program products according to various embodiments of the present invention. Each block in the flowchart or block diagrams may represent a module comprising one or more executable computer instructions, or a portion of an instruction, for implementing the logical function specified in the block. The order of blocks in the diagram is only intended to be illustrative of an example. In alternative implementations, the logical functions illustrated in particular blocks may occur out of the order noted in the figures. For example, two blocks shown as adjacent one another may be carried out simultaneously or, depending on the functionality, in the reverse order. Each block in the flowchart may be implemented in software, hardware or a combination of software and hardware.

The invention claimed is:

1. A data processing system for providing user access to one or more devices, the system comprising:
   a memory; and
   at least one processor in communication with the memory, the at least one processor being configured to:
   i. determine a location identifier for a user, wherein the location identifier defines a predetermined area associated with the one or more devices;
   ii. associate the location identifier with a user identifier for the user;
   iii. communicate the location identifier and associated user identifier to an application; and
   iv. provide the user access to one or more associated capabilities of the one or more devices based on the association of the user identifier and the location identifier;
   v. wherein the location identifier defines a location according to a hierarchical structure stored in a database, wherein each location identifier is associated with a predetermined location and a hierarchical tree is provided that defines a location relative to each predetermined location and wherein the one or more devices are communicatively coupled to a first communication channel and communicatively coupled to a second communication channel wherein the first communication channel is configured to communicate data defining a document to be processed, wherein the second communication channel is configured to communicate data defining device capabilities associated with the one or more devices, and wherein the first communication channel is linked to or associated with the second communication channel using the location identifier.

2. The system according to claim 1, wherein the at least one processor is further configured to receive a user login event message associated with the user.

3. The system according to claim 1, wherein the at least one processor is further configured to generate a user session identifier for the user wherein the user session identifier is associated with a user login event.

4. The system according to claim 1, wherein the at least one processor is communicatively coupled to sending or receiving means for sending or receiving one or more messages or data.

5. The system according to claim 1, wherein the at least one processor is further configured to generate a login event message in response to receiving a user login message.

6. The system according to claim 5, wherein the at least one processor is further configured to send a user login event message to the application.

7. The system according claim 1 wherein the location identifier comprises an alpha-numeric string.

8. The system according to claim 1, further comprising one or more devices for the processing data or a document and wherein the document is a boarding pass or bag tag and wherein the one or more devices are further configured to print or read the data or document.

9. A data processing method for providing user access to one or more devices, the method executed on a computer processor, the method comprising the steps of:
   i. determining a location identifier for a user, wherein the location identifier defines a predetermined area associated with the one or more devices;
   ii. associating the location identifier with a user identifier for the user;
   iii. communicating the location identifier and the associated user identifier to an application; and
   iv. providing the user access to one or more associated capabilities of the one or more devices based on the association of the user identifier and the location identifier;
   v. wherein the location identifier defines a device location according to a hierarchical structure stored in a database, wherein each location identifier is associated with a predetermined location and a hierarchical tree is provided that defines a location relative to each predetermined location and wherein the one or more devices are communicatively coupled to a first communication channel and communicatively coupled to a second communication channel wherein the first communication channel is configured to communicate data defining a document to be processed, wherein the second communication channel is configured to communicate data defining device capabilities associated with the one or more devices, and wherein the first communication channel is linked to or associated with the second communication channel using the location identifier.

10. The method according to claim 9, wherein the location identifier defines a location at any position within a predetermined area or region.

11. The method according to claim 9, wherein the location identifier defines each device location within a plurality of different regions and wherein at least some of the different regions define a sub region which is contained within one or more other regions and wherein each sub region defines a portion or part of the one or more of the different regions.

12. The method according claim 9, further comprising receiving, via an application, a message comprising first data defining data to be processed by one of the devices in response to a request by the user and wherein the first data comprises the location identifier associated with the user or a further user.

13. The method according to claim 12 wherein the first data further comprises a device label associated with the location identifier, and wherein the first data comprises the location identifier concatenated with the device label and wherein the first data is associated with a user session identifier.

14. The method according to claim 9, wherein a first data comprises data defining a document to be processed by one of the devices and wherein the first data comprises a location identifier associated with the user or a further user.

15. The method according to claim 9, wherein a first data comprises data defining a boarding pass or a bag tag.

16. The method according to claim 9, further comprising generating, via an application, a further message for processing of at least some of a first data.

17. The method according to claim 16, wherein the further message comprises data for printing or processing a document such as a boarding pass or a bag tag and wherein the data for printing a boarding pass or bag tag is encoded within the further message according to a portable document file format and further wherein the further message comprises data associated with a boarding pass or bag tag including data defining any one or more of a flight number, departure date, class, origin, destination, departure gate, seat number, passenger name, and seat number, unique bag identifier, and intermediate stops between an origin and destination and wherein the message comprises defining a format associated with the boarding pass or bag tag.

18. A non-transitory computer-readable medium embodying a program for providing user access to one or more devices, wherein the program, when executed by at least one computing device, causes the at least one computing device to:
  i. determine a location identifier for a user, wherein the location identifier defines a predetermined area associated with the one or more devices;
  ii. associate the location identifier with a user identifier for the user;
  iii. communicate the location identifier and the associated user identifier to an application; and
  iv. provide the user access to one or more associated capabilities of the one or more devices based on the associated of the user identifier and the location identifier;
  v. wherein the location identifier defines a device location according to a hierarchical structure stored in a database, wherein each location identifier is associated with a predetermined location and a hierarchical tree is provided that defines a location relative to each predetermined location and wherein the one or more devices are communicatively coupled to a first communication channel and communicatively coupled to a second communication channel wherein the first communication channel is configured to communicate data defining a document to be processed, wherein the second communication channel is configured to communicate data defining device capabilities associated with the one or more devices, and wherein the first communication channel is linked to or associated with the second communication channel using the location identifier.

19. The non-transitory computer-readable medium according to claim 18, wherein only data defining a document to be processed is communicated on the first communication channel and wherein only data defining device capabilities associated with the one or more devices is communicated on the second communication channel.

20. The non-transitory computer-readable medium according to claim 18, wherein the at least one computing device is communicatively coupled to a third communication channel and a fourth communication channel and wherein the third communication channel is linked to or associated with the fourth communication channel using the location identifier.

21. The non-transitory computer-readable medium according to claim 20, wherein only data defining a document to be processed is communicated on the third communication channel and wherein only data defining device capabilities associated with the one or more devices is communicated on the fourth communication channel.

22. The non-transitory computer-readable medium according to claim 18, further comprising a field gateway module or application for uniquely identifying one of a plurality of the devices based on the location identifier and a device label associated with the device and wherein the location identifier and device label are provided within a concatenated field within a message.

23. The non-transitory computer-readable medium according to claim 18, further comprising a module or application for uniquely determining which of a plurality of devices to send a message based on a unique device identifier associated with each device.

24. The non-transitory computer-readable medium according to claim 18, wherein the location identifier is associated with a transportation hub in particular an airport.

25. The system according to claim 1, wherein the association of the user identifier and the location identifier is based on a URL for providing the user access to the one or more associated capabilities.

26. The system according to claim 1, wherein providing the user access to one or more associated capabilities of the one or more devices comprises providing access to a printer in the predetermined area based on the location identifier.

* * * * *